(12) United States Patent  
Sasaki et al.

(10) Patent No.: US 9,336,798 B1  
(45) Date of Patent: May 10, 2016

(54) MAGNETIC HEAD FOR PERPENDICULAR MAGNETIC RECORDING INCLUDING A MAIN POLE WITH A LOWER PROTRUSION

(71) Applicants: Yoshitaka Sasaki, Santa Clara, CA (US); Kazuki Sato, Milpitas, CA (US); Hiroyuki Ito, Milpitas, CA (US); Shigeki Tanemura, Milpitas, CA (US); Hironori Araki, Milpitas, CA (US); Yukinori Ikegawa, Milpitas, CA (US)

(72) Inventors: Yoshitaka Sasaki, Santa Clara, CA (US); Kazuki Sato, Milpitas, CA (US); Hiroyuki Ito, Milpitas, CA (US); Shigeki Tanemura, Milpitas, CA (US); Hironori Araki, Milpitas, CA (US); Yukinori Ikegawa, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 20 days.

(21) Appl. No.: 14/567,590

(22) Filed: Dec. 11, 2014

(51) Int. Cl.  
*G11B 5/187* (2006.01)  
*G11B 5/127* (2006.01)  
*G11B 5/17* (2006.01)  
*G11B 5/31* (2006.01)

(52) U.S. Cl.  
CPC ............... *G11B 5/1278* (2013.01); *G11B 5/17* (2013.01); *G11B 5/187* (2013.01); *G11B 5/315* (2013.01); *G11B 5/3169* (2013.01)

(58) Field of Classification Search  
CPC ....... G11B 5/1278; G11B 5/187; G11B 5/315  
USPC ................ 360/125.13, 125.14, 125.15, 125.3  
See application file for complete search history.

(56) References Cited

U.S. PATENT DOCUMENTS

| | | | |
|---|---|---|---|
| 8,427,781 B1 | 4/2013 | Sasaki et al. | |
| 8,472,137 B2 * | 6/2013 | Hirata | G11B 5/1278 360/125.11 |
| 8,498,080 B2 * | 7/2013 | Sasaki | G11B 5/1278 360/123.03 |
| 8,587,899 B1 | 11/2013 | Sasaki et al. | |
| 8,767,347 B1 * | 7/2014 | Sasaki | G11B 5/1278 360/123.06 |
| 9,082,422 B2 * | 7/2015 | Sasaki | G11B 5/3163 |
| 9,251,812 B2 * | 2/2016 | Sasaki | G11B 5/3163 |
| 2013/0038966 A1 * | 2/2013 | Sasaki | G11B 5/17 360/123.04 |

OTHER PUBLICATIONS

Oct. 28, 2015 U.S. Appl. No. 14/925,365.

* cited by examiner

*Primary Examiner* — Jefferson Evans  
(74) *Attorney, Agent, or Firm* — Oliff PLC

(57) ABSTRACT

A main pole includes a main body and a lower protrusion. The lower protrusion is located at a distance from a medium facing surface. The main body includes a front portion and a rear portion. The front portion has a first side surface and a second side surface. The lower protrusion has a third side surface and a fourth side surface. A first side shield has a first sidewall opposed to the first side surface. A second side shield has a second sidewall opposed to the second side surface. A bottom shield includes a receiving section. The receiving section has a third sidewall opposed to the third side surface, and a fourth sidewall opposed to the fourth side surface. The receiving section and the lower protrusion are formed in a self-aligned manner by using the first and second side shields.

17 Claims, 25 Drawing Sheets

MAGNETIC HEAD FOR PERPENDICULAR MAGNETIC RECORDING INCLUDING A MAIN POLE WITH A LOWER PROTRUSION

BACKGROUND OF THE INVENTION

1. Field of the Invention

The present invention relates to a magnetic head for perpendicular magnetic recording for use to write data on a recording medium by means of a perpendicular magnetic recording system, and more specifically, to a magnetic head for perpendicular magnetic recording that includes a main pole having a lower protrusion.

2. Description of the Related Art

The recording systems of magnetic read/write apparatuses include a longitudinal magnetic recording system in which signals are magnetized in a direction along the plane of a recording medium (the longitudinal direction) and a perpendicular magnetic recording system in which signals are magnetized in a direction perpendicular to the plane of a recording medium. It is known that the perpendicular magnetic recording system is harder to be affected by thermal fluctuation of the recording medium and capable of providing higher linear recording density when compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on the top surface of a substrate. The write head unit includes a main pole for producing a write magnetic field in the direction perpendicular to the plane of the recording medium. The main pole has an end face that is located in a medium facing surface configured to face the recording medium.

The main pole includes, for example, a track width defining portion having an end located in the medium facing surface, and a wide portion connected to the other end of the track width defining portion. The track width defining portion has a top surface having a width smaller than that of the top surface of the wide portion. The width of the top surface of the track width defining portion in the medium facing surface defines the track width. To achieve higher recording densities, the track width should be as small as possible. Here, the length of the track width defining portion in the direction perpendicular to the medium facing surface will be referred to as the neck height. To improve the write characteristics of the write head unit, such as the overwrite property which indicates the overwriting capability, the neck height should be as small as possible.

A magnetic head for use in a magnetic disk drive such as a hard disk drive is typically in the form of a slider. The slider has the medium facing surface. The medium facing surface has an air inflow end (a leading end) and an air outflow end (a trailing end). The slider is configured to slightly fly over the surface of the recording medium by means of an airflow that comes from the leading end into the space between the medium facing surface and the recording medium.

Here, the side of the positions closer to the leading end relative to a reference position will be defined as the leading side, and the side of the positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs depending on the position of the magnetic head across the tracks.

In particular, in a magnetic disk drive of the perpendicular magnetic recording system which is higher in capability of writing on a recording medium than the longitudinal magnetic recording system, the skew can cause the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). To achieve higher recording densities, it is necessary to prevent unwanted erasure.

A known technique for preventing unwanted erasure induced by the skew is to provide a write shield having an end face that is arranged to surround the end face of the main pole in the medium facing surface, as disclosed in U.S. Pat. No. 8,427,781 B1, for example. Such a write shield will hereinafter be referred to as a wrap-around shield. The wrap-around shield includes a bottom shield located on the leading side relative to the main pole, a top shield located on the trailing side relative to the main pole, and two side shields located on opposite sides of the main pole in the track width direction. A magnetic head including the wrap-around shield is capable of preventing unwanted erasure because a magnetic flux produced from the end face of the main pole and spreading in the track width direction can be captured by the write shield.

Further improved recording densities are demanded of magnetic heads for perpendicular magnetic recording. In order for the magnetic heads including the wrap-around shield to provide improved recoding densities, it is important to achieve the following two goals. A first goal is to provide a main pole that is shaped to be small in the end face located in the medium facing surface and large in the area of a cross section parallel to the medium facing surface in the vicinity of the medium facing surface. A second goal is to reduce leakage of magnetic flux from the main pole to the wrap-around shield.

As disclosed in U.S. Pat. No. 8,427,781 B1, a main pole having a main body and a lower protrusion protruding from the main body toward the top surface of the substrate is known as one of the main poles that can achieve the aforementioned first goal. The lower protrusion is located at a distance from the medium facing surface. The lower protrusion has a front end face facing toward the medium facing surface.

A magnetic head including the wrap-around shield and the main pole having the lower protrusion suffers from a problem, as discussed below. According to a conventional method for manufacturing such a magnetic head, typically, the main pole is formed by frame plating, after the formation of the bottom shield, through the use of a mask formed by photolithography.

In this conventional manufacturing method, alignment between the lower protrusion and the two side shields depends on the position accuracy of the mask formed by photolithography. This manufacturing method suffers misalignment between the lower protrusion and the two side shields. Where a conventional magnetic head is manufactured by this manufacturing method into a structure in which the front end face of the lower protrusion is located near the medium facing surface, the occurrence of the aforementioned misalignment would bring the lower protrusion closer to one of the side shields, which would result in leakage of magnetic flux from the lower protrusion to the one of the side shields. In order to prevent the leakage of magnetic flux, conventionally, the front end face of the lower protrusion is positioned at a distance of 0.5 μm or more from the medium facing surface.

Thus, it has not conventionally been possible to achieve both of the aforementioned two goals at the same time.

OBJECT AND SUMMARY OF THE INVENTION

It is an object of the present invention to provide a magnetic head for perpendicular magnetic recording that includes a write shield and a main pole having a lower protrusion and achieves improved recording density, and to provide a method of manufacturing such a magnetic head.

A magnetic head for perpendicular magnetic recording of the present invention includes: a medium facing surface configured to face a recording medium; a coil; a main pole; a write shield formed of a magnetic material; a gap section; and a substrate having a top surface. The coil produces a magnetic field corresponding to data to be written on the recording medium. The main pole passes a magnetic flux corresponding to the magnetic field produced by the coil, and produces a write magnetic field for use to write data on the recording medium by means of a perpendicular magnetic recording system. The gap section is formed of a nonmagnetic material and provided between the main pole and the write shield. The coil, the main pole, the write shield and the gap section are disposed above the top surface of the substrate.

The write shield includes a bottom shield, a top shield, a first side shield and a second side shield. The main pole includes a main body, and a lower protrusion protruding from the main body toward the top surface of the substrate. The lower protrusion is located at a distance from the medium facing surface. The main body includes a front portion and a rear portion, the front portion being located closer to the medium facing surface than is the lower protrusion, the rear portion being located farther from the medium facing surface than is the front portion. The front portion has: an end face located in the medium facing surface; a top surface farthest from the top surface of the substrate; a bottom end opposite to the top surface; and a first side surface and a second side surface opposite to each other in the track width direction. The lower protrusion has: a front end face facing toward the medium facing surface; a bottom surface facing toward the top surface of the substrate; and a third side surface and a fourth side surface opposite to each other in the track width direction.

The bottom shield is located on the rear side in the direction of travel of the recording medium relative to the front portion. The top shield is located on the front side in the direction of travel of the recording medium relative to the front portion. The first and second side shields are located on opposite sides of the front portion in the track width direction. The gap section includes a first portion interposed between the main pole and each of the bottom shield, the first side shield and the second side shield, and a second portion interposed between the main pole and the top shield.

The first side shield has a first front end face located in the medium facing surface, a first sidewall opposed to the first side surface, and a first rear end face contiguous with the first sidewall and opposite to the first front end face. The second side shield has a second front end face located in the medium facing surface, a second sidewall opposed to the second side surface, and a second rear end face contiguous with the second sidewall and opposite to the second front end face.

The bottom shield has a top surface farthest from the top surface of the substrate, and includes a receiving section recessed from the top surface of the bottom shield and receiving a portion of the lower protrusion. The receiving section has a front wall face opposed to the front end face of the lower protrusion, a third sidewall opposed to the third side surface, and a fourth sidewall opposed to the fourth side surface. The first sidewall has a first edge closest to the top surface of the substrate. The second sidewall has a second edge closest to the top surface of the substrate. The third sidewall has a third edge farthest from the top surface of the substrate. The fourth sidewall has a fourth edge farthest from the top surface of the substrate. The third edge is contiguous with the first edge. The fourth edge is contiguous with the second edge.

The magnetic head for perpendicular magnetic recording of the present invention may further include a nonmagnetic layer that is located farther from the medium facing surface than is the bottom shield and contiguous with the bottom shield. The nonmagnetic layer has a recess for receiving another portion of the lower protrusion.

In the magnetic head for perpendicular magnetic recording of the present invention, the distance between the third edge and the fourth edge in the track width direction may increase with increasing distance from the medium facing surface.

In the magnetic head for perpendicular magnetic recording of the present invention, the distance from the medium facing surface to an arbitrary point on the front end face of the lower protrusion may increase with decreasing distance from the arbitrary point to the top surface of the substrate.

In the magnetic head for perpendicular magnetic recording of the present invention, the distance from the top surface of the substrate to an arbitrary point on the top surface of the bottom shield may decrease with increasing distance from the arbitrary point to the medium facing surface.

In the magnetic head for perpendicular magnetic recording of the present invention, each of the first rear end face and the second rear end face may have an edge that is farthest from the top surface of the substrate and parallel to the medium facing surface. The edge of the first rear end face and the edge of the second rear end face may each be located at a distance of 30 to 90 nm from the medium facing surface.

In the magnetic head for perpendicular magnetic recording of the present invention, in any cross section that intersects the rear portion and is parallel to the medium facing surface, the rear portion may have a greater width in the track width direction than the lower protrusion.

In the magnetic head for perpendicular magnetic recording of the present invention, in any cross section that intersects the first and second sidewalls and is parallel to the medium facing surface, the distance between the first sidewall and the second sidewall in the track width direction may decrease with decreasing distance to the top surface of the substrate, and the distance between the first side surface and the second side surface in the track width direction may decrease with decreasing distance to the top surface of the substrate. In such a case, the rear portion may have a first end face opposed to the first rear end face, and a second end face opposed to the second rear end face. The first rear end face may form a smaller angle with respect to a direction perpendicular to the top surface of the substrate than does the first sidewall. The second rear end face may form a smaller angle with respect to the direction perpendicular to the top surface of the substrate than does the second sidewall. The first end face may form a smaller angle with respect to the direction perpendicular to the top surface of the substrate than does the first side surface. The second end face may form a smaller angle with respect to the direction perpendicular to the top surface of the substrate than does the second side surface.

In the magnetic head for perpendicular magnetic recording of the present invention, the first portion of the gap section may include a first gap film and a second gap film. In such a case, the first gap film may have an end that is closest to the medium facing surface and located at a distance from the medium facing surface, and at least a portion of the first gap film may be located in the receiving section. The second gap film may be stacked on the first gap film and have an end located in the medium facing surface.

Alternatively, the first gap film may have an end located in the medium facing surface, and a portion of the first gap film may be located in the receiving section. The second gap film may be stacked on the first gap film and have an end that is closest to the medium facing surface and located at a distance from the medium facing surface, and at least a portion of the second gap film may be located above the receiving section.

A method of manufacturing the magnetic head for perpendicular magnetic recording of the present invention includes: a step of forming an initial bottom shield; a step of forming a first initial side shield and a second initial side shield after the step of forming the initial bottom shield, the first initial side shield including a first portion to be removed and a first pre-side-shield portion to become the first side shield, the second initial side shield including a second portion to be removed and a second pre-side-shield portion to become the second side shield; a step of forming a mask for covering the first pre-side-shield portion of the first initial side shield and the second pre-side-shield portion of the second initial side shield; an etching step of etching portions of the first and second initial side shields that are not covered with the mask and a portion of the initial bottom shield that is not covered with the first and second initial side shields and the mask so that the first portion to be removed of the first initial side shield and the second portion to be removed of the second initial side shield are removed and the receiving section is formed in the initial bottom shield; a step of forming the first portion of the gap section after the etching step; a step of forming an initial main pole after the step of forming the first portion of the gap section; a step of forming the second portion of the gap section after the step of forming the initial main pole; a step of forming an initial top shield after the step of forming the second portion of the gap section; a step of forming the coil; and a step of forming the medium facing surface so that the initial bottom shield becomes the bottom shield, the first initial side shield becomes the first side shield, the second initial side shield becomes the second side shield, the initial main pole becomes the main pole, and the initial top shield becomes the top shield.

The first pre-side-shield portion has the first sidewall. The first portion to be removed has a fifth sidewall contiguous with the first sidewall. The second pre-side-shield portion has the second sidewall. The second portion to be removed has a sixth sidewall contiguous with the second sidewall.

In the method of manufacturing the magnetic head for perpendicular magnetic recording of the present invention, the magnetic head for perpendicular magnetic recording may further include a nonmagnetic layer that is located farther from the medium facing surface than is the bottom shield and contiguous with the bottom shield. The nonmagnetic layer has a recess for receiving another portion of the lower protrusion. The manufacturing method of the present invention may further include a step of forming an initial nonmagnetic layer before the step of forming the first initial side shield and the second initial side shield. In such a case, the first initial side shield and the second initial side shield are formed over the initial bottom shield and the initial nonmagnetic layer. Further, in the etching step, a portion of the initial nonmagnetic layer that is not covered with the first and second initial side shields is etched so that the recess is formed in the initial nonmagnetic layer and the initial nonmagnetic layer thereby becomes the nonmagnetic layer.

In the method of manufacturing the magnetic head for perpendicular magnetic recording of the present invention, in any cross section that intersects the rear portion and is parallel to the medium facing surface, the rear portion may have a greater width in the track width direction than the lower protrusion. In the step of forming the initial main pole, the initial main pole may be formed by frame plating.

In the method of manufacturing the magnetic head for perpendicular magnetic recording of the present invention, the first portion of the gap section may include a first gap film and a second gap film. In such a case, the first gap film may have an end that is closest to the medium facing surface and located at a distance from the medium facing surface, and at least a portion of the first gap film may be located in the receiving section. The second gap film may have an end located in the medium facing surface. The step of forming the first portion of the gap section may include a step of forming the first gap film and a step of forming the second gap film to cover the first gap film.

Alternatively, the first gap film may have an end located in the medium facing surface, and a portion of the first gap film may be located in the receiving section. The second gap film may have an end that is closest to the medium facing surface and located at a distance from the medium facing surface, and at least a portion of the second gap film may be located above the receiving section. The step of forming the first portion of the gap section may include a step of forming the first gap film and a step of forming the second gap film on the first gap film.

The magnetic head for perpendicular magnetic recording and the method of manufacturing the same of the present invention are able to achieve both of the first goal of providing a main pole that is shaped to be small in the end face located in the medium facing surface and large in the area of a cross section parallel to the medium facing surface in the vicinity of the medium facing surface and the second goal of reducing leakage of magnetic flux from the main pole to the write shield at the same, and consequently provide improved recording density.

Other and further objects, features and advantages of the present invention will appear more fully from the following description.

DETAILED DESCRIPTION OF THE PREFERRED EMBODIMENTS

First Embodiment

Figure 6:
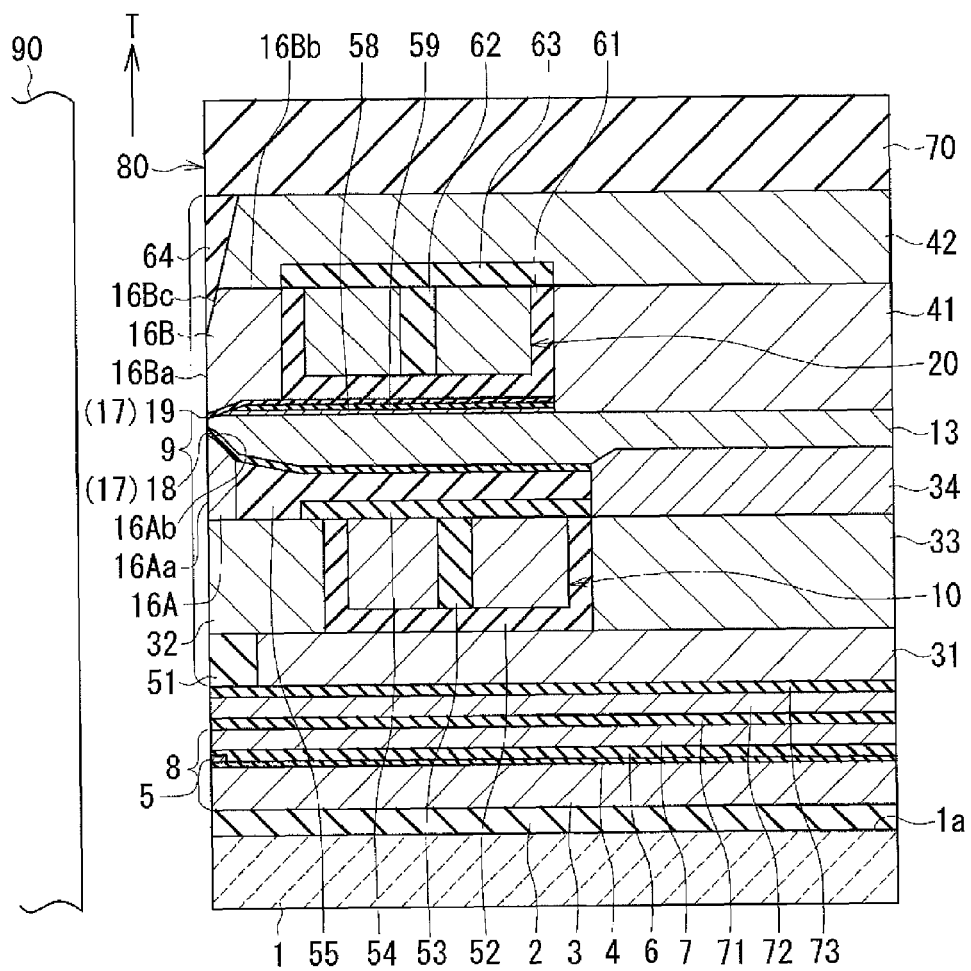
FIG. 6 is a cross-sectional view of the magnetic head according to the first embodiment of the invention.
Figure 7:
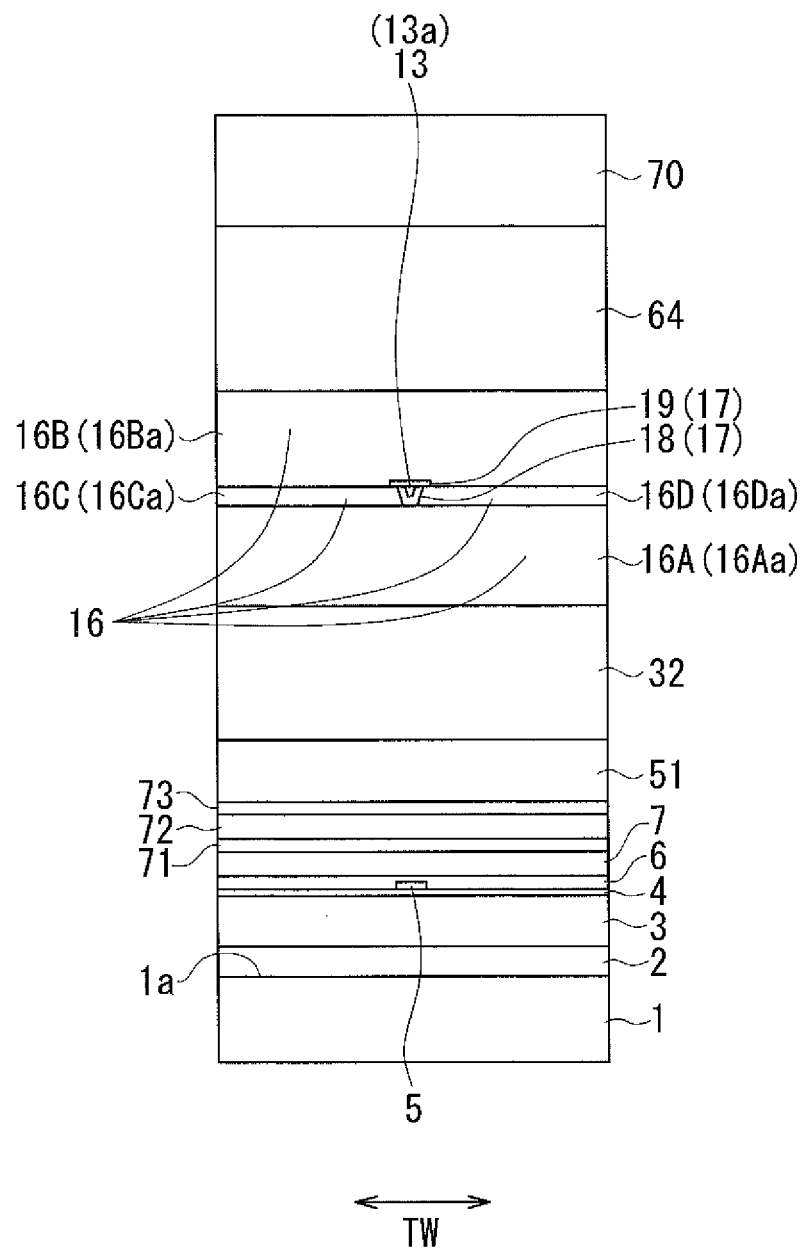
FIG. 7 is a front view showing the medium facing surface of the magnetic head according to the first embodiment of the invention.
Figure 8:
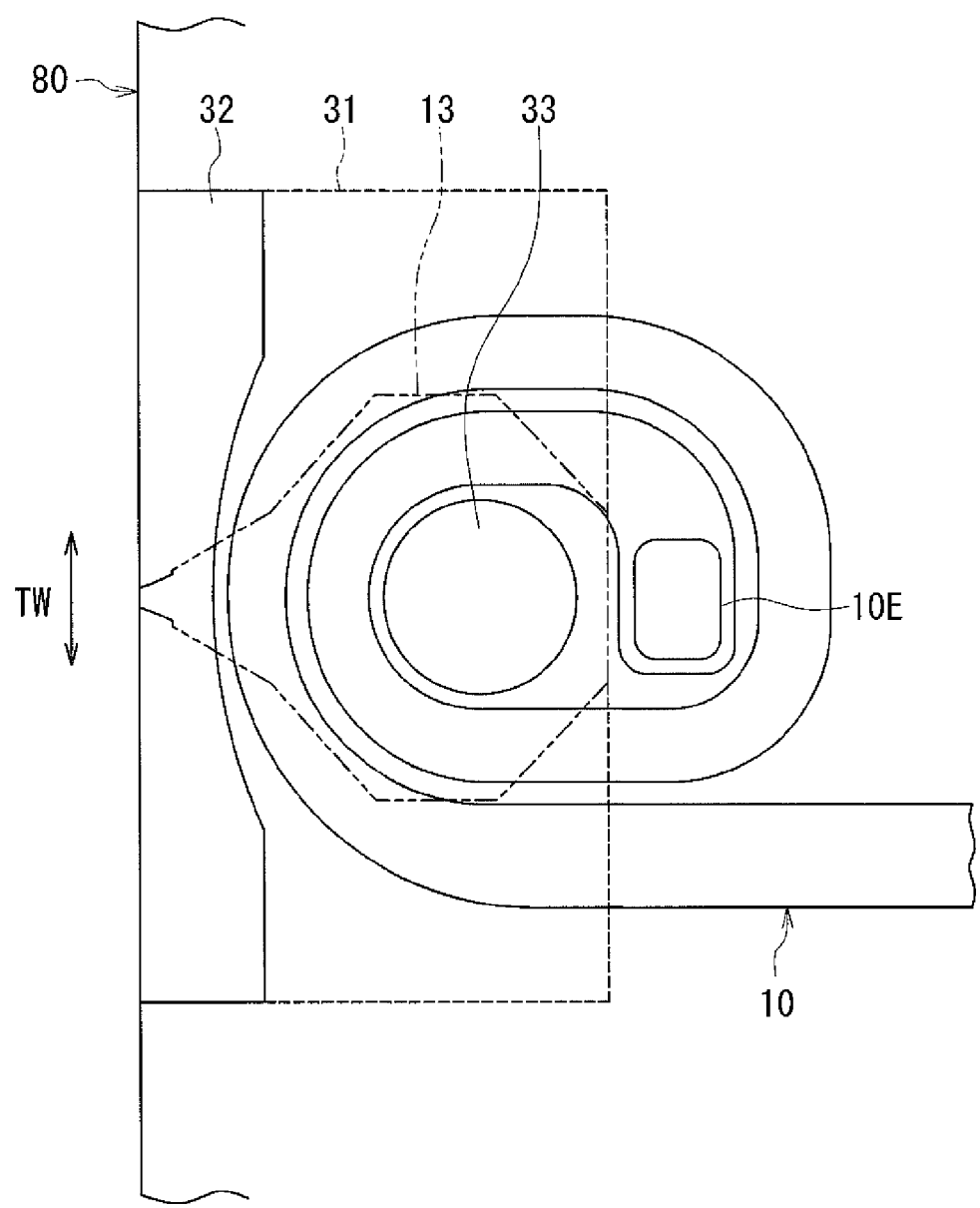
FIG. 8 is a plan view showing a first portion of a coil of the magnetic head according to the first embodiment of the invention.
Figure 9:
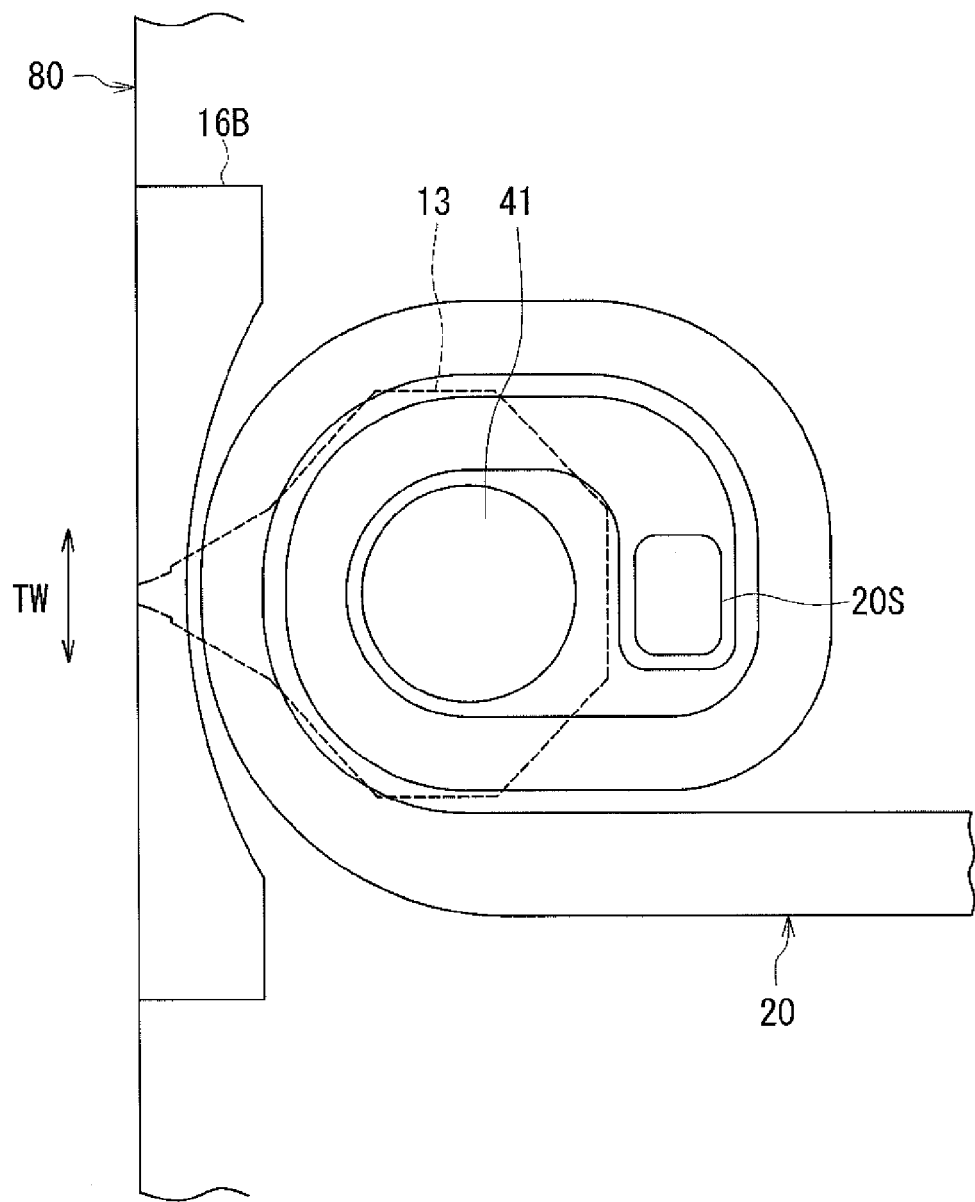
FIG. 9 is a plan view showing a second portion of the coil of the magnetic head according to the first embodiment of the invention.

Preferred embodiments of the present invention will now be described in detail with reference to the drawings. First, reference is made to FIG. 6 to FIG. 9 to describe the configuration of a magnetic head according to a first embodiment of the invention. FIG. 6 is a cross-sectional view of the magnetic head according to the present embodiment. The arrow labeled T in FIG. 6 indicates the direction of travel of a recording medium. FIG. 7 is a front view showing the medium facing surface of the magnetic head according to the present embodiment. FIG. 8 is a plan view showing a first portion of a coil of the magnetic head according to the present embodiment. FIG. 9 is a plan view showing a second portion of the coil of the magnetic head according to the present embodiment. In each of FIG. 7 to FIG. 9, the arrow labeled TW indicates the track width direction.

As shown in FIG. 6, the magnetic head for perpendicular magnetic recording (hereinafter simply referred to as the magnetic head) according to the present embodiment has a medium facing surface 80 configured to face a recording medium 90. Further, as shown in FIG. 6 and FIG. 7, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The parts from the first read shield layer 3 to the second read shield layer 7 constitute a read head unit 8. The magnetic head further includes a nonmagnetic layer 71 formed of a nonmagnetic material and disposed on the second read shield layer 7, a middle shield layer 72 formed of a magnetic material and disposed on the nonmagnetic layer 71, a nonmagnetic layer 73 formed of a nonmagnetic material and disposed on the middle shield layer 72, and a write head unit 9 disposed on the nonmagnetic layer 73. The middle shield layer 72 has the function of shielding the MR element 5 from magnetic fields generated in the write head unit 9. The nonmagnetic layers 71 and 73 are formed of alumina, for example.

The write head unit 9 includes a coil, a main pole 13, a write shield 16, and a gap section 17. The coil produces a magnetic field corresponding to data to be written on the recording medium 90. The coil includes a first portion 10 and a second portion 20. The first portion 10 and the second portion 20 are both formed of a conductive material such as copper. The first portion 10 and the second portion 20 are connected in series or in parallel. The main pole 13 has an end face 13a located in the medium facing surface 80. The main pole 13 passes a magnetic flux corresponding to the magnetic field produced by the coil, and produces a write magnetic field for use to write data on the recording medium 90 by means of a perpendicular magnetic recording system. FIG. 6 shows a cross section that intersects the end face 13a of the main pole 13 and that is perpendicular to the medium facing surface 80 and to the top surface 1a of the substrate 1.

As shown in FIG. 7, the write shield 16 includes a bottom shield 16A, a top shield 16B, a first side shield 16C, and a second side shield 16D. The bottom shield 16A is located on the leading side, i.e., the rear side in the direction T of travel of the recording medium 90, relative to the main pole 13. The top shield 16B is located on the trailing side, i.e., the front side in the direction T of travel of the recording medium 90, relative to the main pole 13. The first and second side shields 16C and 16D are located on opposite sides of the main pole 13 in the track width direction TW and magnetically couple the bottom shield 16A and the top shield 16B to each other.

As shown in FIG. 6 and FIG. 7, the bottom shield 16A has a front end face 16Aa located in the medium facing surface 80, and a top surface 16Ab farthest from the top surface 1a of the substrate 1. The top shield 16B has a front end face 16Ba located in the medium facing surface 80, a top surface 16Bb farthest from the top surface 1a of the substrate 1, and a connecting surface 16Bc connecting the front end face 16Ba and the top surface 16Bb. The distance from the medium facing surface 80 to an arbitrary point on the connecting surface 16Bc increases with increasing distance from the arbitrary point to the top surface 1a of the substrate 1. As shown in FIG. 7, the first side shield 16C has a first front end face 16Ca located in the medium facing surface 80. The second side shield 16D has a second front end face 16Da located in the medium facing surface 80.

The front end face 16Aa is located on the rear side in the direction T of travel of the recording medium 90 relative to the end face 13a of the main pole 13. The front end face 16Ba is located on the front side in the direction T of travel of the recording medium 90 relative to the end face 13a of the main pole 13. The first and second front end faces 16Ca and 16Da are located on opposite sides of the end face 13a of the main pole 13 in the track width direction TW. In the medium facing surface 80, the front end faces 16Aa, 16Ba, 16Ca and 16Da are arranged to surround the end face 13a of the main pole 13.

The write shield 16 is formed of a magnetic material. The material employed for the write shield 16 may be CoFeN, CoNiFe, NiFe, or CoFe, for example.

The gap section 17 is provided between the main pole 13 and the write shield 16. The gap section 17 includes a first portion interposed between the main pole 13 and each of the bottom shield 16A, the first side shield 16C and the second side shield 16D, and a second portion interposed between the main pole 13 and the top shield 16B.

The write head unit 9 further includes magnetic layers 31, 32, 33, 34, 41 and 42. Each of the magnetic layers 31 to 34, 41 and 42 is formed of a magnetic material. The material employed for each of the magnetic layers 31 to 34, 41 and 42 may be CoFeN, CoNiFe, NiFe, or CoFe, for example. The magnetic layer 31 lies on the nonmagnetic layer 73. The magnetic layer 31 has an end face that faces toward the medium facing surface 80 and that is located at a distance from the medium facing surface 80. The write head unit 9 further includes an insulating layer 51 formed of an insulating material, lying on the nonmagnetic layer 73 and surrounding the magnetic layer 31. The insulating layer 51 is formed of alumina, for example.

The magnetic layer 32 is located near the medium facing surface 80 and lies on the magnetic layer 31 and the insulating layer 51. The magnetic layer 32 has an end face located in the medium facing surface 80. The magnetic layer 33 is located farther from the medium facing surface 80 than is the magnetic layer 32 and lies on the magnetic layer 31.

The write head unit 9 further includes an insulating film 52 formed of an insulating material and isolating the first portion 10 from the magnetic layers 31 to 33, and an insulating layer 53 formed of an insulating material and disposed around the first portion 10 and the magnetic layer 32 and in the space between adjacent turns of the first portion 10. The top surfaces of the first portion 10, the magnetic layers 32 and 33, the insulating film 52 and the insulating layer 53 are even with each other. The insulating film 52 and the insulating layer 53 are formed of alumina, for example.

The bottom shield 16A lies on the magnetic layer 32. The magnetic layer 34 lies on the magnetic layer 33. The write head unit 9 further includes an insulating layer 54 formed of an insulating material and a nonmagnetic layer 55 formed of a nonmagnetic material. The insulating layer 54 lies on the top surfaces of the first portion 10, the insulating film 52 and the insulating layer 53 and part of the top surface of the magnetic layer 32. The nonmagnetic layer 55 lies on the insulating layer 54 and surrounds the bottom shield 16A and the magnetic layer 34. The insulating layer 54 and the nonmagnetic layer 55 are formed of alumina, for example.

The first and second side shields 16C and 16D are disposed on the bottom shield 16A and in contact with the top surface 16Ab of the bottom shield 16A. The first and second side shields 16C and 16D have their respective sidewalls and rear end faces. The respective sidewalls and rear end faces of the first and second side shields 16C and 16D will be described in detail later.

The write head unit 9 further includes a first gap layer 18 formed of a nonmagnetic material. The first gap layer 18 is disposed along the sidewalls and rear end faces of the first and second side shields 16C and 16D, the top surface 16Ab of the bottom shield 16A and the top surface of the nonmagnetic layer 55. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18. The first gap layer 18 has a thickness in the range of 40 to 100 nm, for example.

The main pole 13 is disposed over the bottom shield 16A and the nonmagnetic layer 55 with the first gap layer 18 interposed between the main pole 13 and each of the bottom shield 16A and the nonmagnetic layer 55. As shown in FIG. 7, the first gap layer 18 is interposed also between the main pole 13 and each of the first and second side shields 16C and 16D. The first portion of the gap section 17 is constituted by a portion of the first gap layer 18 that is interposed between the main pole 13 and each of the bottom shield 16A, the first side shield 16C and the second side shield 16D.

The main pole 13 is in contact with the top surface of the magnetic layer 34 at a location away from the medium facing surface 80. The main pole 13 is formed of a magnetic metal material. The material employed for the main pole 13 may be NiFe, CoNiFe, or CoFe, for example. The shape of the main pole 13 will be described in more detail later.

Figure 4:
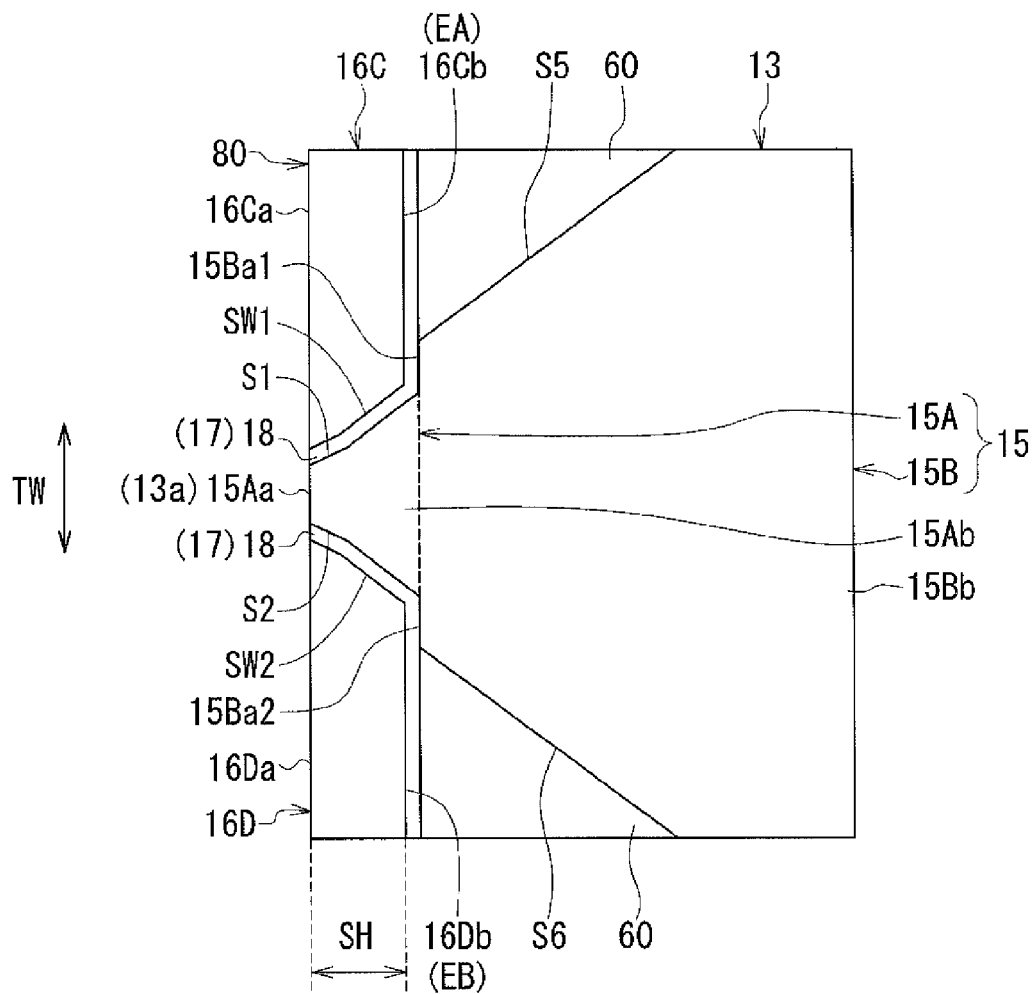
FIG. 4 is a plan view showing the main pole, the first side shield and the second side shield of the magnetic head according to the first embodiment of the invention.

The write head unit 9 further includes a nonmagnetic layer 60 formed of a nonmagnetic material and disposed around the main pole 13, the first side shield 16C and the second side shield 16D. The nonmagnetic layer 60 is shown in FIG. 4, which will be described later. The nonmagnetic layer 60 is formed of alumina, for example.

The write head unit 9 further includes a nonmagnetic metal layer 58 formed of a nonmagnetic metal material and lying on a first portion of the top surface of the main pole 13 located away from the medium facing surface 80, and an insulating layer 59 formed of an insulating material and lying on the top surface of the nonmagnetic metal layer 58. The nonmagnetic metal layer 58 is formed of Ru, NiCr, or NiCu, for example. The insulating layer 59 is formed of alumina, for example.

The write head unit 9 further includes a second gap layer 19 formed of a nonmagnetic material and disposed to cover the main pole 13, the nonmagnetic metal layer 58 and the insulating layer 59. The material employed for the second gap layer 19 may be a nonmagnetic insulating material such as alumina or a nonmagnetic conductive material such as Ru, NiCu, Ta, W, NiB, or NiP.

The top shield 16B is disposed over the side shields 16C and 16D and the second gap layer 19, and in contact with the top surfaces of the side shields 16C and 16D and the second gap layer 19. The second portion of the gap section 17 is constituted by a portion of the second gap layer 19 that is interposed between the main pole 13 and the top shield 16B.

In the medium facing surface 80, a portion of the front end face 16Ba of the top shield 16B is spaced from the end face 13a of the main pole 13 by a predetermined distance created by the thickness of the second gap layer 19. The thickness of the second gap layer 19 preferably falls within the range of 5 to 60 nm, and may be 30 to 60 nm, for example. The end face 13a of the main pole 13 has a side adjacent to the second gap layer 19, and this side of the end face 13a defines the track width.

The magnetic layer 41 lies on a second portion of the top surface of the main pole 13 located away from the medium facing surface 80. The second portion of the top surface of the main pole 13 is located farther from the medium facing surface 80 than is the first portion of the top surface of the main pole 13.

The write head unit 9 further includes: an insulating film 61 formed of an insulating material and interposed between the second portion 20 and each of the top shield 16B, the second gap layer 19 and the magnetic layer 41; an insulating layer 62 formed of an insulating material and disposed in the space between adjacent turns of the second portion 20; and a non-illustrated nonmagnetic layer formed of a nonmagnetic material and disposed around the second portion 20 and the top shield 16B. The top surfaces of the second portion 20, the top shield 16B, the magnetic layer 41, the insulating film 61, the insulating layer 62 and the non-illustrated nonmagnetic layer are even with each other. The write head unit 9 further includes an insulating layer 63 formed of an insulating material and disposed over the top surfaces of the second portion 20, the insulating film 61 and the insulating layer 62. The insulating film 61, the insulating layers 62 and 63 and the non-illustrated nonmagnetic layer are formed of alumina, for example.

The magnetic layer 42 lies on the top shield 16B, the magnetic layer 41 and the insulating layer 63, and connects the top shield 16B and the magnetic layer 41. The magnetic layer 42 has an end face that faces toward the medium facing surface 80 and that is located at a distance from the medium facing surface 80. The distance from the medium facing surface 80 to an arbitrary point on the end face of the magnetic layer 42 increases with increasing distance from the arbitrary point to the top surface 1a of the substrate 1.

The write head unit 9 further includes a nonmagnetic layer 64 formed of a nonmagnetic material and disposed around the magnetic layer 42. A portion of the nonmagnetic layer 64 is interposed between the medium facing surface 80 and each of the connecting surface 16Bc of the top shield 16B and the end face of the magnetic layer 42 facing toward the medium facing surface 80. The nonmagnetic layer 64 is formed of alumina, for example.

The magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located on the front side in the direction T of travel of the recording medium 90 relative to the read head unit 8.

The write head unit 9 includes the coil including the first and second portions 10 and 20, the main pole 13, the write shield 16, the gap section 17, and the magnetic layers 31 to 34, 41 and 42. The coil, the main pole 13, the write shield 16 and the gap section 17 are located above the top surface 1a of the substrate 1. The write shield 16 includes the bottom shield 16A, the top shield 16B, the first side shield 16C and the second side shield 16D. The gap section 17 includes the first portion constituted by a portion of the first gap layer 18, and the second portion constituted by a portion of the second gap layer 19. The gap section 17 is formed of nonmagnetic material since the first and second gap layers 18 and 19 are both formed of nonmagnetic material.

The magnetic layers 31 to 34 are located on the rear side in the direction T of travel of the recording medium 90 relative to the main pole 13, and constitute a first return path section. As shown in FIG. 6, the first return path section (the magnetic layers 31 to 34) connects the write shield 16 and part of the main pole 13 located away from the medium facing surface 80 to each other so that a first space is defined by the main pole 13, the first portion of the gap section 17 (the gap layer 18), the write shield 16 and the first return path section. The first portion 10 of the coil passes through the first space.

The magnetic layers 41 and 42 are located on the front side in the direction T of travel of the recording medium 90 relative to the main pole 13, and constitute a second return path section. The second return path section (the magnetic layers 41 and 42) connects the write shield 16 and part of the main pole 13 located away from the medium facing surface 80 to each other so that a second space is defined by the main pole 13, the second portion of the gap section 17 (the gap layer 19), the write shield 16 and the second return path section. The second portion 20 of the coil passes through the second space.

The write shield 16 captures a disturbance magnetic field applied to the magnetic head from the outside thereof. This makes it possible to prevent the disturbance magnetic field from being intensively captured into the main pole 13 and thereby causing erroneous writing on the recording medium 90. The write shield 16 also has the function of capturing a magnetic flux that is produced from the end face 13a of the main pole 13 and spreads in directions other than a direction perpendicular to the plane of the recording medium 90, and thereby preventing the magnetic flux from reaching the recording medium 90. Furthermore, the write shield 16, the first return path section (the magnetic layers 31 to 34) and the second return path section (the magnetic layers 41 and 42) have the function of allowing a magnetic flux that has been produced from the end face 13a of the main pole 13 and has magnetized the recording medium 90 to flow back to the main pole 13.

The first and second portions 10 and 20 of the coil will now be described in detail with reference to FIG. 8 and FIG. 9. FIG. 8 is a plan view showing the first portion 10. The first portion 10 is wound approximately twice around the magnetic layer 33. The first portion 10 includes a portion that extends to pass between the magnetic layer 32 and the magnetic layer 33, in particular, within the first space. The first portion 10 has a coil connection 10E electrically connected to the second portion 20.

FIG. 9 is a plan view showing the second portion 20. The second portion 20 is wound approximately twice around the magnetic layer 41. The second portion 20 includes a portion that extends to pass between the top shield 16B and the magnetic layer 41, in particular, within the second space. The second portion 20 has a coil connection 20S electrically connected to the coil connection 10E of the first portion 10. The coil connection 20S is electrically connected to the coil connection 10E via a first and a second connection layer of columnar shape (not illustrated) that penetrate a plurality of layers interposed between the first portion 10 and the second portion 20. The first connection layer and the second connection layer are stacked in this order on the coil connection 10E. The coil connection 20S lies on the second connection layer. The first and second connection layers are each formed of a conductive material such as copper. In the example shown in FIG. 8 and FIG. 9, the first portion 10 and the second portion 20 are connected in series.

Figure 1:
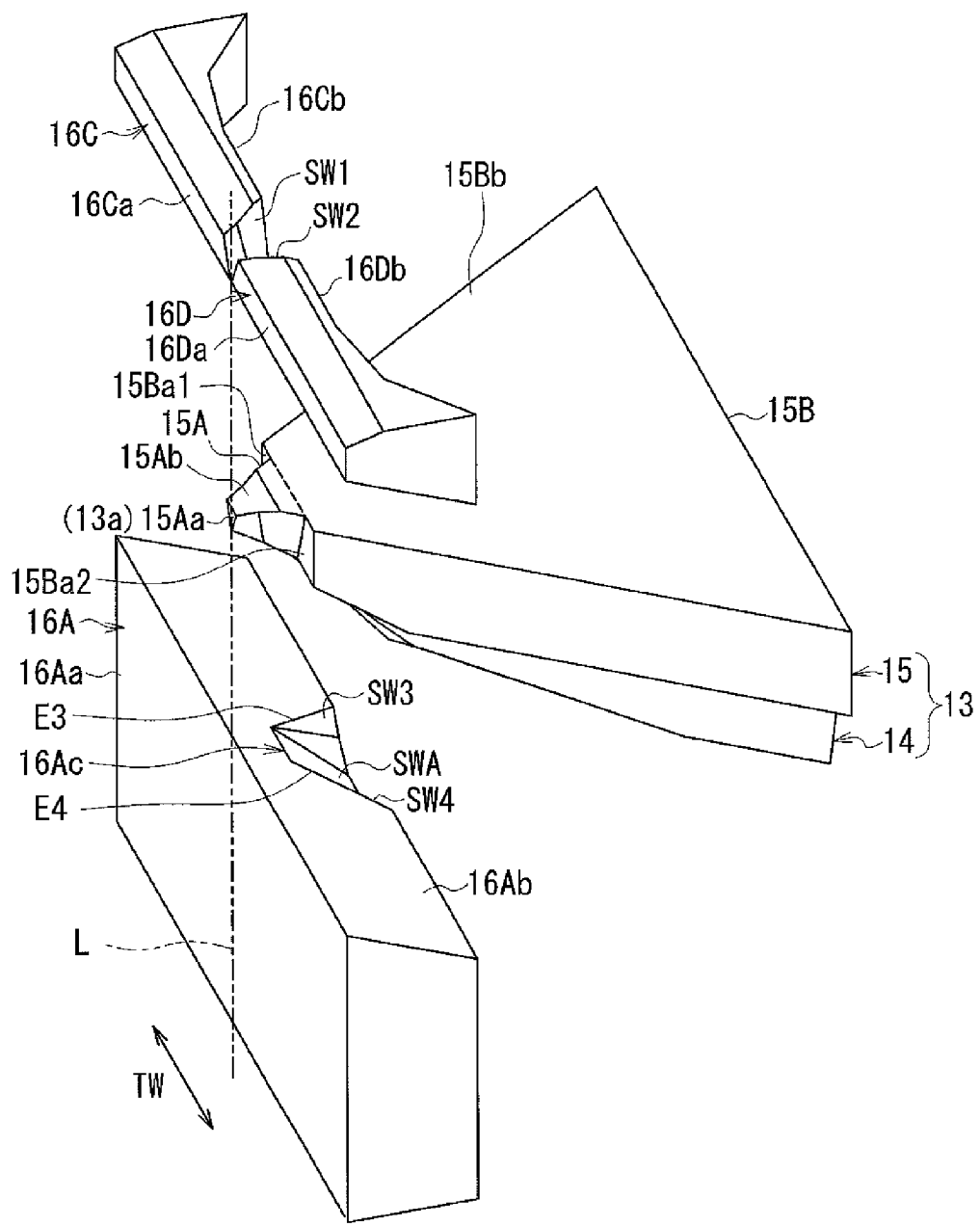
FIG. 1 is a perspective view showing a main pole, a bottom shield, a first side shield and a second side shield of a magnetic head according to a first embodiment of the invention.
Figure 2:
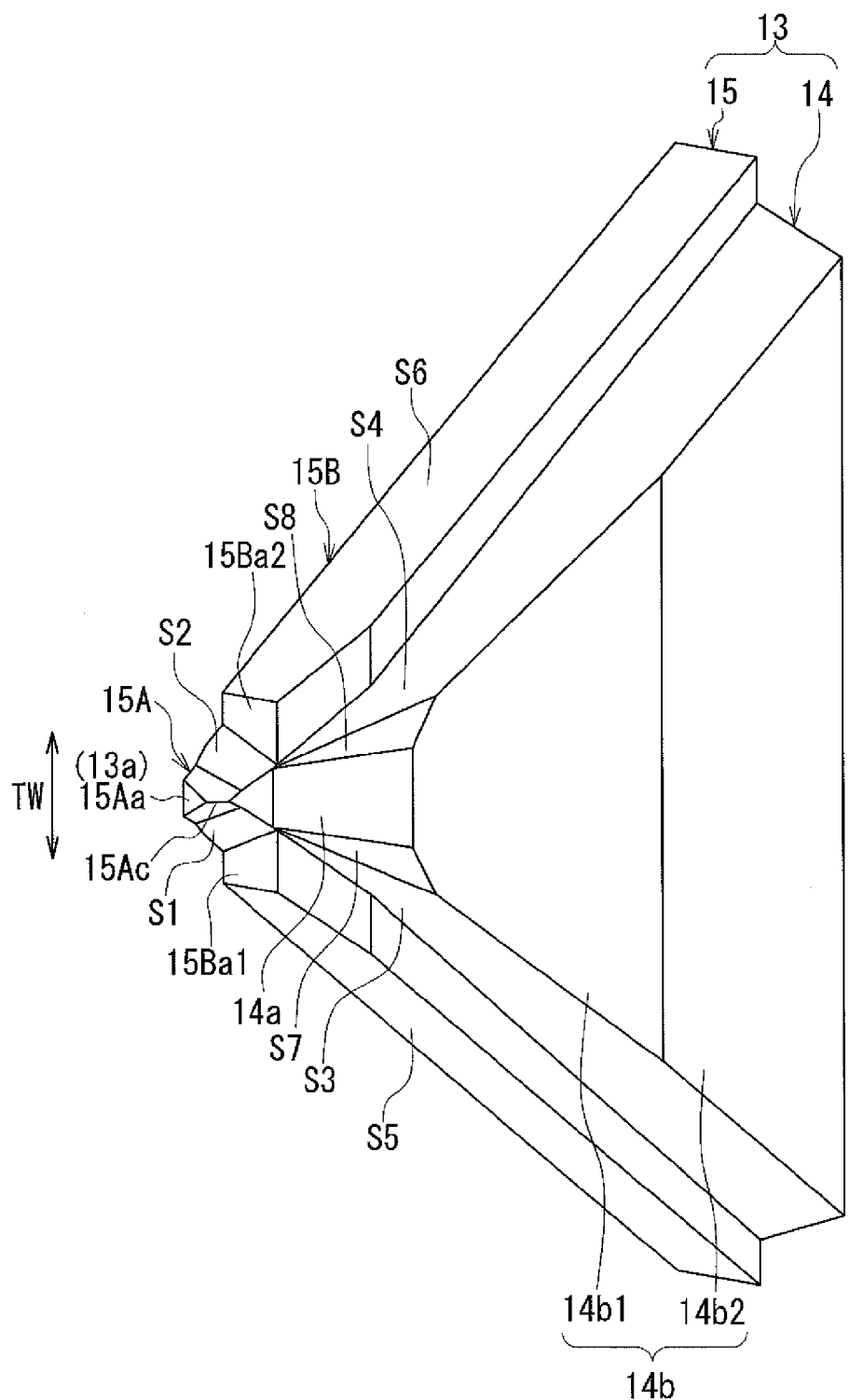
FIG. 2 is a perspective view of the main pole of the magnetic head according to the first embodiment of the invention.
Figure 3:
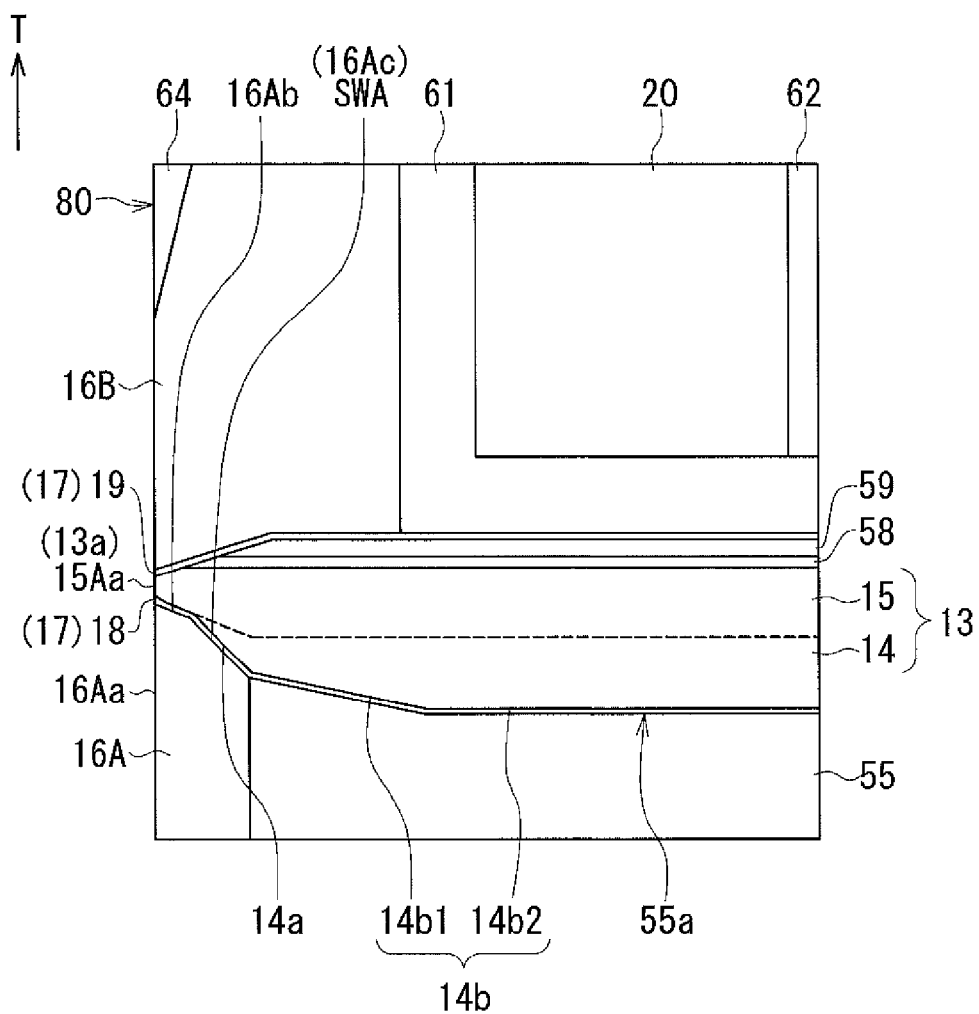
FIG. 3 is a cross-sectional view showing the main part of the magnetic head according to the first embodiment of the invention.

The main pole 13, the bottom shield 16A, the first side shield 16C, the second side shield 16D and the nonmagnetic layer 55 will now be described in detail. First, the shape of the main pole 13 will be described with reference to FIG. 1 to FIG. 4. FIG. 1 is an exploded perspective view of the main pole 13, the bottom shield 16A and the side shields 16C and 16D. In FIG. 1, the straight dash-dot-dot line labeled L indicates an imaginary straight line perpendicular to the top surface 1a of the substrate 1 and passing through the end face 13a of the main pole 13. FIG. 1 depicts the main pole 13, the bottom shield 16A and the side shields 16C and 16D as separate from each other along the imaginary straight line L. FIG. 2 is a perspective view of the main pole 13. FIG. 3 is a cross-sectional view showing the main part of the magnetic head. FIG. 4 is a plan view showing the main pole 13 and the side shields 16C and 16D.

As shown in FIG. 1 to FIG. 3, the main pole 13 includes a main body 15, and a lower protrusion 14 protruding from the main body 15 toward the top surface 1a (see FIG. 6 and FIG. 7) of the substrate 1. In FIG. 3 the boundary between the main body 15 and the lower protrusion 14 is indicated in a broken line. As shown in FIG. 3, the lower protrusion 14 is located at a distance from the medium facing surface 80. As shown in FIG. 1, FIG. 2 and FIG. 4, the main body 15 includes a front portion 15A and a rear portion 15B. The front portion 15A is located closer to the medium facing surface 80 than is the lower protrusion 14. The rear portion 15B is located farther from the medium facing surface 80 than is the front portion 15A. In FIG. 1 and FIG. 4 the boundary between the front portion 15A and the rear portion 15B is indicated in a broken line.

As shown in FIG. 1, FIG. 2 and FIG. 4, the front portion 15A has: an end face 15Aa located in the medium facing surface 80; a top surface 15Ab farthest from the top surface 1a (see FIG. 6 and FIG. 7) of the substrate 1; a bottom end 15Ac opposite to the top surface 15Ab; and a first side surface S1 and a second side surface S2 opposite to each other in the track width direction TW. The end face 15Aa of the front portion 15A also serves as the end face 13a of the main pole 13. The end face 15Aa of the front portion 15A has a first side adjacent to the second gap layer 19, a second side connected to one end of the first side, and a third side connected to the other end of the first side. The first side defines the track width. The position of an end of a record bit to be recorded on the recording medium 90 is determined by the position of the first side. The width of the end face 15Aa of the front portion 15A in the track width direction TW decreases with increasing distance from the first side, in other words, with decreasing distance to the top surface 1a of the substrate 1. Each of the second side and the third side forms an angle of, for example, 7° to 17°, or preferably 10° to 15°, with respect to a direction perpendicular to the top surface 1a of the substrate 1. The first side has a length in the range of 0.05 to 0.20 µm, for example.

As shown in FIG. 1, the top surface 15Ab of the front portion 15A includes an inclined portion and a flat portion, the inclined portion being closer to the medium facing surface 80 than the flat portion. The inclined portion has a first end located in the medium facing surface 80 and a second end opposite thereto. The flat portion is connected to the second end of the inclined portion. The inclined portion is inclined such that its second end is located on the front side in the direction T (see FIG. 3) of travel of the recording medium 90 relative to its first end. The flat portion extends in a direction substantially perpendicular to the medium facing surface 80. The width of the top surface 15Ab in the track width direction TW may gradually increase with increasing distance from the medium facing surface 80 as shown in FIG. 1 and FIG. 4, or may be constant regardless of distance from the medium facing surface 80.

The bottom end 15Ac of the front portion 15A has a first end located in the medium facing surface 80 and a second end opposite thereto. The bottom end 15Ac is inclined such that its second end is located on the rear side in the direction T (see FIG. 3) of travel of the recording medium 90 relative to its first end. In the example shown in FIG. 2, the bottom end 15Ac of the front portion 15A includes an edge portion and a planar portion, the edge portion being closer to the medium facing surface 80 than the planar portion. The edge portion is an edge formed by two intersecting planes. The planar portion is a plane connecting two planes to each other. Alternatively, the entire bottom end 15Ac may be constituted by the planar portion.

The first and second side surfaces S1 and S2 of the front portion 15A are each constituted by a plurality of planes. Further, the first and second side surfaces S1 and S2 are each inclined with respect to the direction perpendicular to the top surface 1a of the substrate 1. The first and second side surfaces S1 and S2 will be described in detail later.

As shown in FIG. 1, FIG. 2 and FIG. 4, the rear portion 15B has: a first end face 15Ba1 and a second end face 15Ba2 facing toward the medium facing surface 80; a top surface 15Bb farthest from the top surface 1a (see FIG. 6 and FIG. 7) of the substrate 1; and a fifth side surface S5 and a sixth side surface S6 opposite to each other in the track width direction TW. The first end face 15Ba1 connects the first side surface S1 and the fifth side surface S5. The second end face 15Ba2 connects the second side surface S2 and the sixth side surface S6.

The first and second end faces 15Ba1 and 15Ba2 are closer to perpendicular to the top surface 1a of the substrate 1 than are the first and second side surfaces S1 and S2. The first and second end faces 15Ba1 and 15Ba2 will be described in detail later.

The top surface 15Bb of the rear portion 15B is contiguous with the flat portion of the top surface 15Ab of the front portion 15A. The top surface 15Bb extends in a direction substantially perpendicular to the medium facing surface 80. As shown in FIG. 1 and FIG. 4, the width in the track width direction TW of the top surface 15Bb is greater than that of the top surface 15Ab of the front portion 15A at the boundary with the front portion 15A, and increases with increasing distance from the medium facing surface 80.

Like the first and second end faces 15Ba1 and 15Ba2, the fifth and sixth side surfaces S5 and S6 of the rear portion 15B are closer to perpendicular to the top surface 1a of the substrate 1 than are the first and second side surface S1 and S2 of the front portion 15A. Further, in any cross section that intersects the fifth and sixth side surfaces S5 and S6 and is parallel to the medium facing surface 80, the distance between the fifth side surface S5 and the sixth side surface S6 in the track width direction TW may be constant regardless of distance to the top surface 1a of the substrate 1, or may increase or decrease with decreasing distance to the top surface 1a of the substrate 1.

As shown in FIG. 2 and FIG. 3, the lower protrusion 14 has: a front end face 14a facing toward the medium facing surface 80; a bottom surface 14b facing toward the top surface 1a of the substrate 1; and a third side surface S3 and a fourth side surface S4 opposite to each other in the track width direction TW. As shown in FIG. 2, in any cross section that intersects the rear portion 15B and is parallel to the medium facing surface 80, the rear portion 15B has a greater width in the track width direction TW than the lower protrusion 14.

As shown in FIG. 3, the front end face 14a of the lower protrusion 14 is inclined with respect to the medium facing surface 80. The distance from the medium facing surface 80 to an arbitrary point on the front end face 14a of the lower protrusion 14 increases with decreasing distance from the arbitrary point to the top surface 1a of the substrate 1. The front end face 14a forms a greater angle with respect to a direction perpendicular to the medium facing surface 80 than does the bottom end 15Ac of the front portion 15A. The front end face 14a has an end that is closest to the medium facing surface 80 and connected to the second end of the bottom end 15Ac of the front portion 15A. This end of the front end face 14a is at a distance of, for example, 30 to 90 nm from the medium facing surface 80. As shown in FIG. 2, the width in the track width direction TW of the front end face 14a is equal to that of the bottom end 15Ac of the front portion 15A at the boundary with the front portion 15A, and increases with increasing distance from the medium facing surface 80.

As shown in FIG. 2, the width in the track width direction TW of the bottom surface 14b of the lower protrusion 14 is greater than that of the front end face 14a, and increases with increasing distance from the medium facing surface 80. Further, as shown in FIG. 2 and FIG. 3, the bottom surface 14b includes an inclined portion 14b1 and a flat portion 14b2, the inclined portion 14b1 being closer to the medium facing surface 80 than the flat portion 14b2. The inclined portion 14b1 has a first end connected to the front end face 14a and a second end farther from the medium facing surface 80 than the first end. The flat portion 14b2 is connected to the second end of the inclined portion 14b1. The inclined portion 14b1 is inclined such that its second end is located on the rear side in the direction T of travel of the recording medium 90 relative to its first end. The flat portion 14b2 extends in a direction substantially perpendicular to the medium facing surface 80.

In the present embodiment, the third and fourth side surfaces S3 and S4 of the lower protrusion 14 are inclined in the following manner. In any cross section that intersects the third and fourth side surfaces S3 and S4 and is parallel to the medium facing surface 80, the distance between the third side surface S3 and the fourth side surface S4 in the track width direction TW decreases with decreasing distance to the top surface 1a of the substrate 1. Alternatively, in the aforementioned cross section, the distance between the third side surface S3 and the fourth side surface S4 in the track width direction TW may be constant regardless of distance to the top surface 1a of the substrate 1.

In the present embodiment, as shown in FIG. 2, the lower protrusion 14 further has a first connecting surface S7 connecting the front end face 14a and the third side surface S3, and a second connecting surface S8 connecting the front end face 14a and the fourth side surface S4. The first and second connecting surfaces S7 and S8 may be flat or curved.

Figure 5:
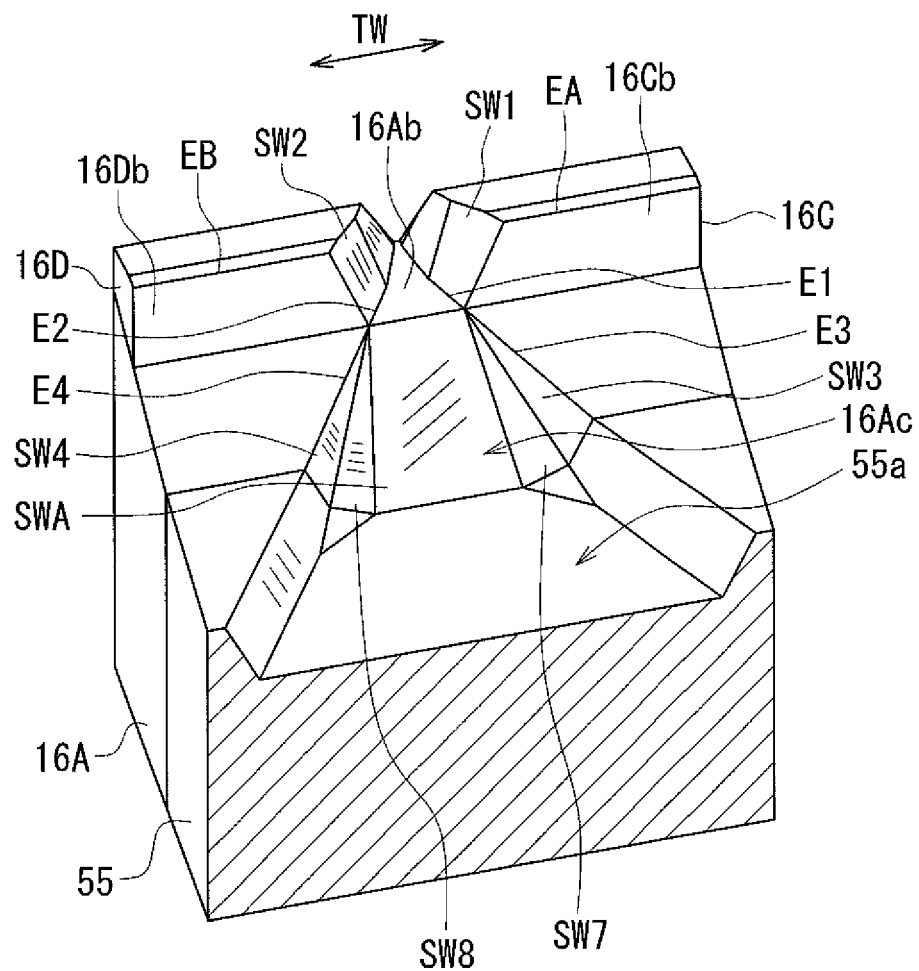
FIG. 5 is a perspective view showing the bottom shield, the first side shield, the second side shield and a nonmagnetic layer of the magnetic head according to the first embodiment of the invention.

The shapes and locations of the bottom shield 16A, the first side shield 16C, the second side shield 16D and the nonmagnetic layer 55 will now be described with reference to FIG. 1 to FIG. 5. FIG. 5 is a perspective view showing the bottom shield 16A, the first side shield 16C, the second side shield 16D and the nonmagnetic layer 55. In FIG. 5, the hatched portion represents a cross section of the nonmagnetic layer 55 parallel to the medium facing surface 80. As shown in FIG. 1 and FIG. 3, the bottom shield 16A is located on the rear side in the direction T of travel of the recording medium 90 relative to the front portion 15A. The top shield 16B is located on the front side in the direction T of travel of the recording medium 90 relative to the front portion 15A. As shown in FIG. 1 and FIG. 4, the first and second side shields 16C and 16D are located on opposite sides of the front portion 15A in the track width direction TW.

As shown in FIG. 1, FIG. 4 and FIG. 5, the first side shield 16C has a first sidewall SW1 and a first rear end face 16Cb in addition to the first front end face 16Ca described previously. The first sidewall SW1 is opposed to the first side surface S1 of the front portion 15A. The first rear end face 16Cb is contiguous with the first sidewall SW1 and opposite to the first front end face 16Ca. The second side shield 16D has a second sidewall SW2 and a second rear end face 16Db in addition to the second front end face 16Da described previously. The second sidewall SW2 is opposed to the second side surface S2 of the front portion 15A. The second rear end face 16Db is contiguous with the second sidewall SW2 and opposite to the second front end face 16Da. In the example shown in FIG. 1 and FIG. 5, the first sidewall SW1 of the first side shield 16C and the second sidewall SW2 of the second side shield 16D are each constituted by a plurality of planes contiguous with each other.

As shown in FIG. 5, the first sidewall SW1 of the first side shield 16C has a first edge E1 closest to the top surface 1a (see FIG. 6 and FIG. 7) of the substrate 1. The second sidewall SW2 has a second edge E2 closest to the top surface 1a of the substrate 1. In the example shown in FIG. 5, each of the first and second edges E1 and E2 is constituted by a plurality of straight lines contiguous with each other. The distance between the first edge E1 and the second edge E2 in the track width direction TW increases with increasing distance from the medium facing surface 80.

As shown in FIG. 1 and FIG. 5, each of the first and second sidewalls SW1 and SW2 is inclined with respect to the direction perpendicular to the top surface 1a of the substrate 1. In any cross section that intersects the first and second sidewalls SW1 and SW2 and is parallel to the medium facing surface 80, the distance between the first sidewall SW1 and the second sidewall SW2 in the track width direction TW decreases with decreasing distance to the top surface 1a of the substrate 1. Each of the first sidewall SW1 and the second sidewall SW2 forms an angle of, for example, 7° to 17°, or preferably 10° to 15°, with respect to the direction perpendicular to the top surface 1a of the substrate 1.

As shown in FIG. 2, the first side surface S1 of the front portion 15A opposed to the first sidewall SW1 is inclined with respect to the direction perpendicular to the top surface 1a of the substrate 1, like the first sidewall SW1. The second side surface S2 of the front portion 15A opposed to the second sidewall SW2 is inclined inclined with respect to the direction perpendicular to the top surface 1a of the substrate 1, like the second sidewall SW2. In any cross section that intersects the first and second sidewalls SW1 and SW2 and is parallel to the medium facing surface 80, the distance between the first side surface S1 and the second side surface S2 decreases with decreasing distance to the top surface 1a of the substrate 1. The preferred range of the angle formed by each of the side surfaces S1 and S2 with respect to the direction perpendicular to the top surface 1a of the substrate 1 is the same as that for the case of the sidewalls SW1 and SW2.

As shown in FIG. 1 and FIG. 5, the first rear end face 16Cb of the first side shield 16C and the second rear end face 16Db of the second side shield 16D are closer to perpendicular to the top surface 1a of the substrate 1 than are the first sidewall SW1 of the first side shield 16C and the second sidewall SW2 of the second side shield 16D. In other words, the first rear end face 16Cb forms a smaller angle with respect to the direction perpendicular to the top surface 1a of the substrate 1 than does the first sidewall SW1, and the second rear end face 16Db forms a smaller angle with respect to the direction perpendicular to the top surface 1a of the substrate 1 than does the second sidewall SW2.

As shown in FIG. 4, the first end face 15Ba1 of the rear portion 15B is opposed to the first rear end face 16Cb. The second end face 15Ba2 of the rear portion 15B is opposed to the second rear end face 16Db. Like the first rear end face 16Cb, the first end face 15Ba1 is closer to perpendicular to the top surface 1a of the substrate 1 than is the first side surface S1 of the front portion 15A opposed to the first sidewall SW1. In other words, the first end face 15Ba1 forms a smaller angle with respect to the direction perpendicular to the top surface 1a of the substrate 1 than does the first side surface S1. Like the second rear end face 16Db, the second end face 15Ba2 is closer to perpendicular to the top surface 1a of the substrate 1 than is the second side surface S2 of the front portion 15A opposed to the second sidewall SW2. In other words, the second end face 15Ba2 forms a smaller angle with respect to the direction perpendicular to the top surface 1a of the substrate 1 than does the second side surface S2.

As described previously, the fifth side surface S5 and the sixth side surface S6 of the rear portion 15B are also closer to perpendicular to the top surface 1a of the substrate 1 than are the first side surface S1 and the second side surface S2 of the front portion 15A. In other words, the fifth side surface S5 forms a smaller angle with respect to the direction perpendicular to the top surface 1a of the substrate 1 than does the first side surface S1, and the sixth side surface S6 forms a smaller angle with respect to the direction perpendicular to the top surface 1a of the substrate 1 than does the second side surface S2.

As shown in FIG. 4, the first rear end face 16Cb has an edge EA farthest from the top surface 1a of the substrate 1 and parallel to the medium facing surface 80. Similarly, the second rear end face 16Db has an edge EB farthest from the top surface 1a of the substrate 1 and parallel to the medium facing surface 80. Each of the edges EA and EB is at a distance of 30 to 90 nm from the medium facing surface 80. As shown in FIG. 4, the distance between the medium facing surface 80 and each of the edges EA and EB will be defined as side shield height SH.

As shown in FIG. 1 and FIG. 5, the bottom shield 16A includes a receiving section 16Ac recessed from the top surface 16Ab and receiving a portion of the lower protrusion 14. The receiving section 16Ac has a front wall face SWA opposed to the front end face 14a of the lower protrusion 14, a third sidewall SW3 opposed to the third side surface S3 of the lower protrusion 14, and a fourth sidewall SW4 opposed to the fourth side surface S4 of the lower protrusion 14. As shown in FIG. 1 and FIG. 3, the distance from the medium facing surface 80 to an arbitrary point on the front wall face SWA of the receiving section 16Ac increases with decreasing distance from the arbitrary point to the top surface 1a (see FIG. 6 and FIG. 7) of the substrate 1.

In the present embodiment, the top surface 16Ab of the bottom shield 16A is inclined with respect to the direction perpendicular to the medium facing surface 80 in the following manner. As shown in FIG. 1, FIG. 3 and FIG. 5, the distance from the top surface 1a of the substrate 1 to an arbitrary point on the top surface 16Ab decreases with increasing distance from the arbitrary point to the medium facing surface 80. The top surface 16Ab forms a smaller angle with respect to the direction perpendicular to the medium facing surface 80 than does the front wall face SWA. As will be described later in relation to another embodiment, the top surface 16Ab may extend in a direction substantially perpendicular to the medium facing surface 80.

As shown in FIG. 1 and FIG. 5, the third sidewall SW3 of the receiving section 16Ac has a third edge E3 farthest from the top surface 1a of the substrate 1. The fourth sidewall SW4 of the receiving section 16Ac has a fourth edge E4 farthest from the top surface 1a of the substrate 1. The distance between the third edge E3 and the fourth edge E4 in the track width direction TW increases with increasing distance from the medium facing surface 80.

In the present embodiment, the third and fourth sidewalls SW3 and SW4 of the receiving section 16Ac are inclined in the following manner. In any cross section that intersects the third and fourth sidewalls SW3 and SW4 and is parallel to the medium facing surface 80, the distance between the third sidewall SW3 and the fourth sidewall SW4 in the track width direction TW decreases with decreasing distance to the top surface 1a of the substrate 1. Alternatively, in the aforementioned cross section, the distance between the third sidewall SW3 and the fourth sidewall SW4 in the track width direction TW may be constant regardless of distance to the top surface 1a of the substrate 1.

In the present embodiment, as shown in FIG. 5, the receiving section 16Ac may further have a third connecting surface SW7 opposed to the first connecting surface S7 of the lower protrusion 14 and connecting the front wall face SWA and the third sidewall SW3, and a fourth connecting surface SW8 opposed to the second connecting surface S8 of the lower protrusion 14 and connecting the front wall face SWA and the fourth sidewall SW4. The third and fourth connecting surfaces SW7 and SW8 may be flat or curved.

As shown in FIG. 3 and FIG. 5, the nonmagnetic layer 55 is located farther from the medium facing surface 80 than is the bottom shield 16A and contiguous with the bottom shield 16A. The nonmagnetic layer 55 has a recess 55a for receiving another portion of the lower protrusion 14. The recess 55a has a bottom opposed to the bottom surface 14b of the lower protrusion 14, a first wall face opposed to the third side surface S3 of the lower protrusion 14, and a second wall face opposed to the fourth side surface S4 of the lower protrusion 14. The bottom of the recess 55a is contiguous with the front wall face SWA of the receiving section 16Ac. The first wall face of the recess 55a is contiguous with the third sidewall SW3 of the receiving section 16Ac. The second wall face of the recess 55a is contiguous with the fourth sidewall SW4 of the receiving section 16Ac.

The first and second wall faces of the recess 55a are inclined in the following manner. In any cross section that intersects the first and second wall faces and is parallel to the medium facing surface 80, the distance between the first wall face and the second wall face in the track width direction TW decreases with decreasing distance to the top surface 1a (see FIG. 6 and FIG. 7) of the substrate 1. Alternatively, in the aforementioned cross section, the distance between the first wall face and the second wall face in the track width direction TW may be constant regardless of distance to the top surface 1a of the substrate 1.

Relative location of the receiving section 16Ac and the main pole 13 with respect to the first and second side shields 16C and 16D will now be described with reference to FIG. 5. As shown in FIG. 5, the third edge E3 is contiguous with the first edge E1, and the fourth edge E4 is contiguous with the second edge E2. Thus, the receiving section 16Ac is aligned with the first and second side shields 16C and 16D. A portion of the lower protrusion 14 of the main pole 13 is received in the receiving section 16Ac. Therefore, the lower protrusion 14 is also aligned with the first and second side shields 16C and 16D.

A manufacturing method for the magnetic head according to the present embodiment will now be described. As shown in FIG. 6 and FIG. 7, the manufacturing method for the magnetic head according to the present embodiment first forms the insulating layer 2, the first read shield layer 3, and the first read shield gap film 4 in this order on the substrate 1. Next, the MR element 5 and leads (not illustrated) connected to the MR element 5 are formed on the first read shield gap film 4. The MR element 5 and the leads are then covered with the second read shield gap film 6. Then, the second read shield layer 7, the nonmagnetic layer 71, the middle shield layer 72, and the nonmagnetic layer 73 are formed in this order on the second read shield gap film 6.

Next, the magnetic layer 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the magnetic layer 31 is exposed. Next, the magnetic layer 32 is formed on the top surface of the insulating layer 51 and a portion of the top surface of the magnetic layer 31, and the magnetic layer 33 is formed on another portion of the top surface of the magnetic layer 31, by frame plating, for example. The insulating film 52 is then formed over the entire top surface of the stack. Next, the first portion 10 of the coil is formed by frame plating, for example. The insulating layer 53 is then formed over the entire top surface of the stack. The insulating film 52 and the insulating layer 53 are then polished by, for example, CMP, until the first portion 10 and the magnetic layers 32 and 33 are exposed.

Next, the insulating layer 54 is formed over the entire top surface of the stack. The insulating layer 54 is then selectively etched to form therein a first opening for exposing the top surface of the magnetic layer 32, a second opening for exposing the top surface of the magnetic layer 33, and a third opening for exposing the coil connection 10E (see FIG. 8) of the first portion 10. Then, an initial bottom shield, which will later become the bottom shield 16A, is formed on the magnetic layer 32 at the location of the first opening, the magnetic layer 34 is formed on the magnetic layer 33 at the location of the second opening, and the first connection layer (not illustrated) is formed on the coil connection 10E at the location of the third opening, by frame plating, for example. Next, an initial nonmagnetic layer, which will later become the nonmagnetic layer 55, is formed over the entire top surface of the stack. The initial nonmagnetic layer is then polished by, for example, CMP, until the initial bottom shield, the magnetic layer 34 and the first connection layer are exposed. Next, portions of the initial bottom shield and the initial nonmagnetic layer are taper-etched by, for example, ion beam etching, so as to provide the initial bottom shield with the top surface 16Ab. Portions of the magnetic layer 34 and the first connection layer are also etched in this etching process.

Reference is now made to FIG. 10A to FIG. 17B to describe a series of steps to be performed after the foregoing step up to the formation of an initial main pole, which will later become the main pole 13. FIG. 10A to FIG. 17B each show a stack of layers formed in the process of manufacturing the magnetic head. In these figures, the symbol 16AP represents the initial bottom shield, and the symbol 55P represents the initial nonmagnetic layer. Portions that are closer to the substrate 1 relative to the initial bottom shield 16AP and the initial nonmagnetic layer 55P are omitted from these figures. The symbol "ABS" shown in some of these figures indicates the location at which the medium facing surface 80 is to be formed.

Figure 13A:
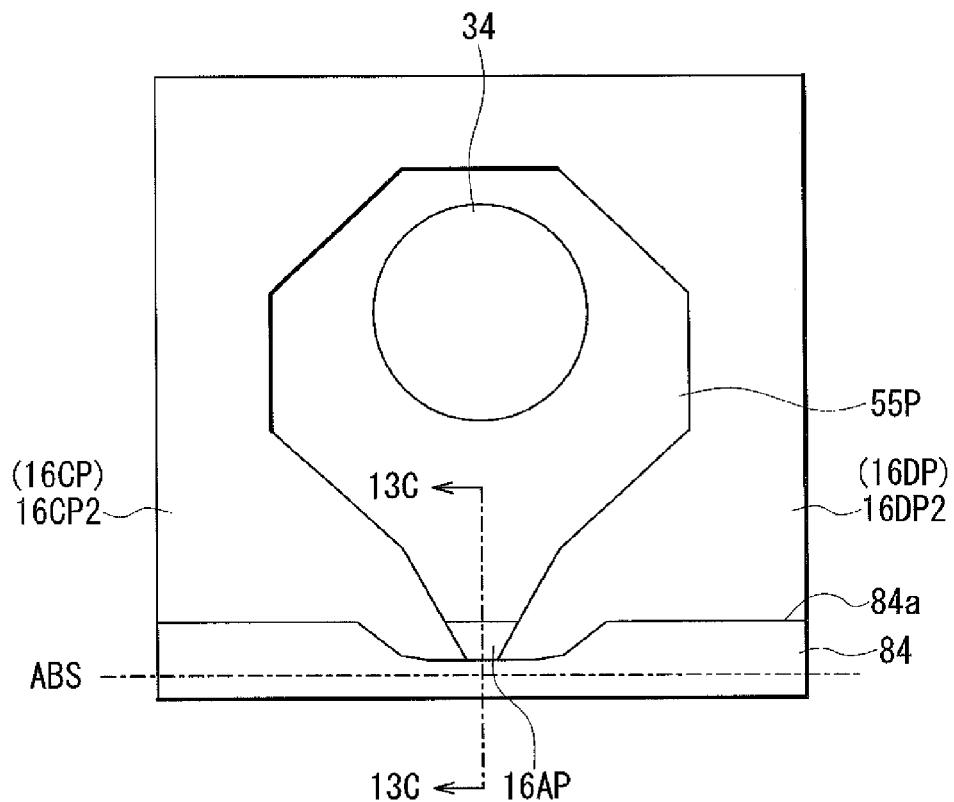
FIG. 13A to FIG. 13D are explanatory diagrams showing a step that follows the step shown in FIG. 12A and FIG. 12B.
Figure 13B:
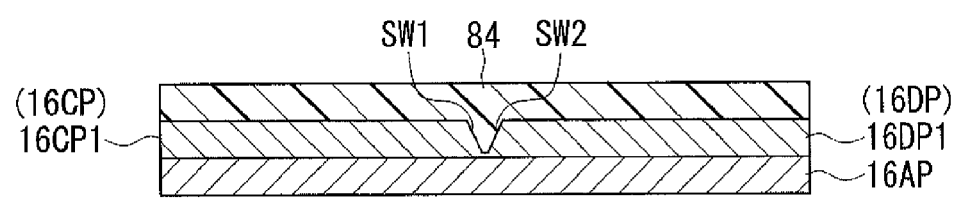
Figure 13C:
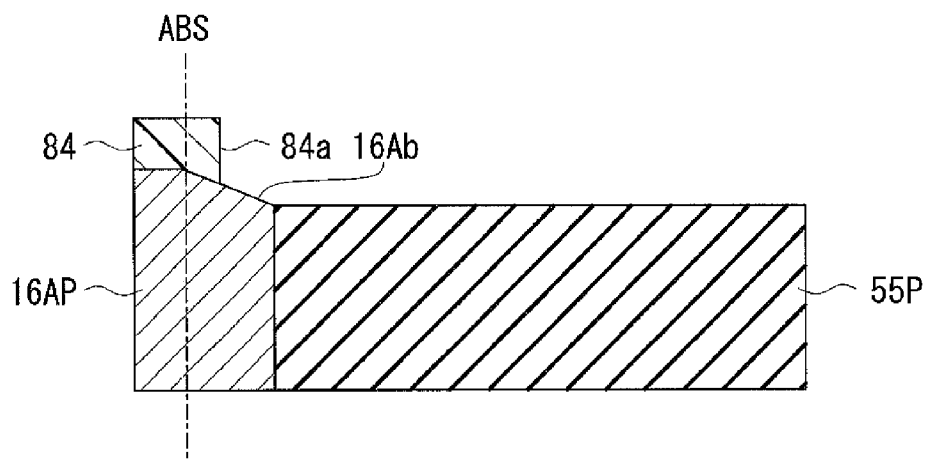
Figure 13D:
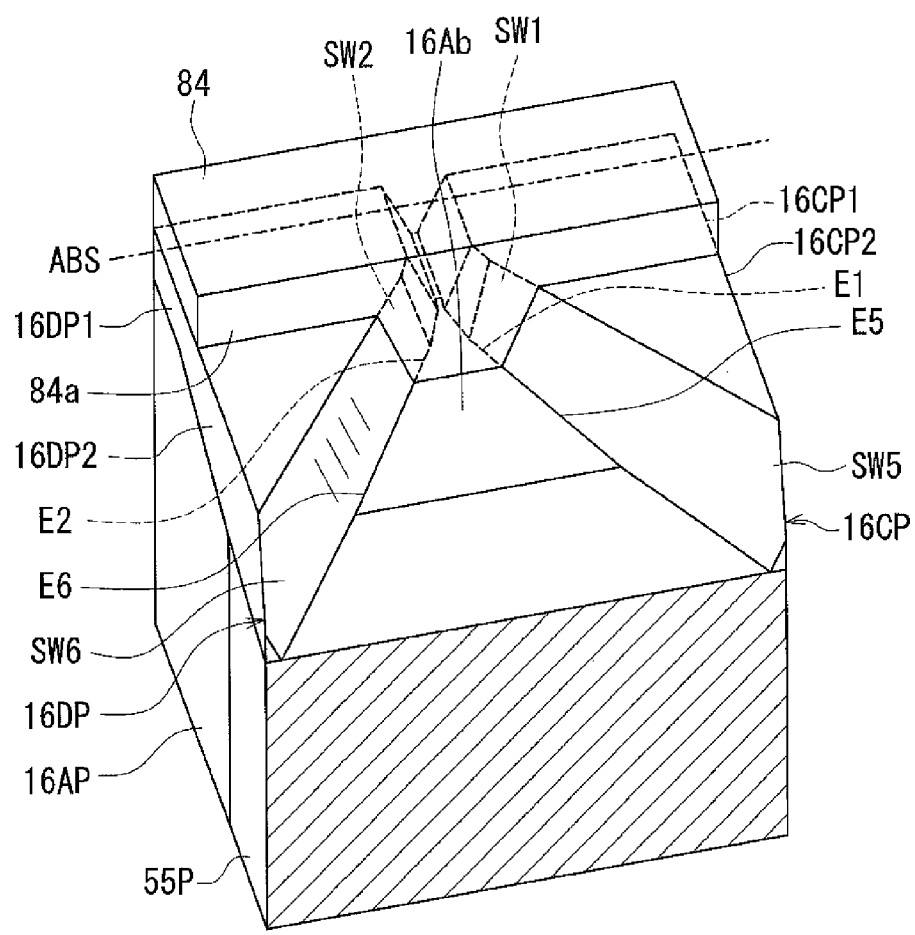

FIG. nA (n is an integer between 10 and 17 inclusive) shows the top surface of part of the stack. FIG. nB shows a cross section of the stack taken at the location at which the medium facing surface 80 is to be formed. FIG. 13C and FIG. 14C each show a cross section perpendicular to the medium facing surface 80 and to the top surface 1a of the substrate 1. The line 13C-13C on FIG. 13A indicates the location of the cross section shown in FIG. 13C. The line 14C-14C on FIG. 14A indicates the location of the cross section shown in FIG. 14C. FIG. 13D is a perspective view illustrating the step of FIG. 13A to FIG. 13C. FIG. 14D is a perspective view illustrating the step of FIG. 14A to FIG. 14C.

Figure 10A:
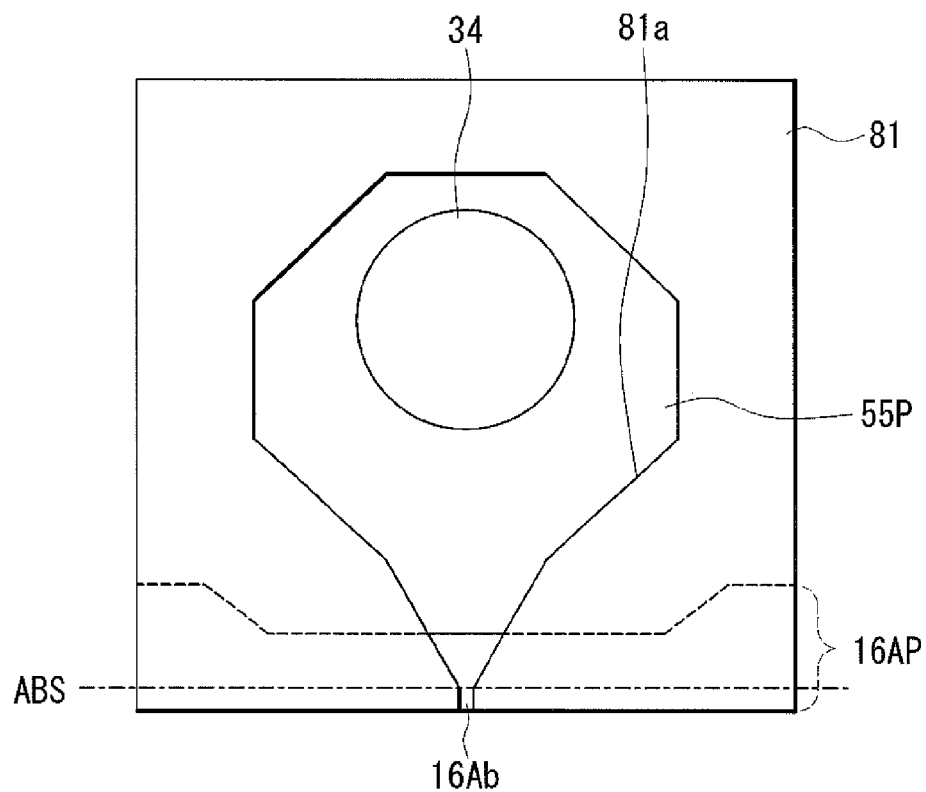
FIG. 10A and FIG. 10B are explanatory diagrams showing a step of a method of manufacturing the magnetic head according to the first embodiment of the invention.
Figure 10B:
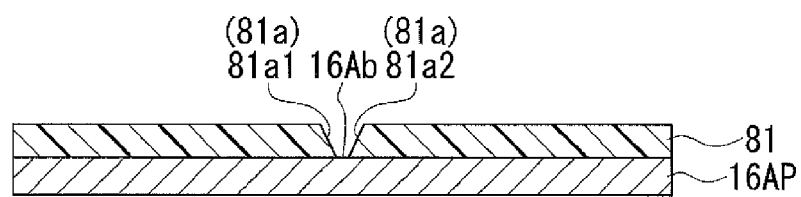

FIG. 10A and FIG. 10B show a step to follow the taper-etching of the portions of the initial bottom shield 16AP and the initial nonmagnetic layer 55P. In this step, first, a seed layer (not illustrated) is formed over the initial bottom shield 16AP and the initial nonmagnetic layer 55P by sputtering or ion beam deposition, for example. Next, a first resist layer 81 is formed over the initial bottom shield 16AP and the initial nonmagnetic layer 55P by patterning a photoresist layer of a positive photoresist by photolithography. The first resist layer 81 has an opening 81a shaped to correspond to the shape of the main pole 13 to be formed later. The first resist layer 81 also includes portions shaped to correspond to the first and second side shields 16C and 16D to be formed later.

Now, a method of forming the first resist layer 81 will be described in detail. First, a photoresist layer of a positive photoresist is formed over the entire top surface of the stack. The photoresist layer is formed such that its top surface is higher in level than the top surfaces of the first and second side shields 16C and 16D to be formed later. Next, the photoresist layer is selectively exposed to light through a photomask. The photomask has a light-transmitting portion which passes the light for exposure therethrough, and a light-blocking portion which blocks the light for exposure. The light-transmitting portion of the photomask includes a portion shaped to correspond to the planar shape of the main pole 13 to be formed later. The light-blocking portion of the photomask includes a portion shaped to correspond to the planar shape of the first and second side shields 16C and 16D to be formed later. The exposed photoresist layer is then developed. As a result of the exposure, the area of the photoresist layer irradiated with the light having passed through the light-transmitting portion of the photomask becomes soluble in a developing solution, while the other area remains insoluble in the developing solution. The photoresist layer remaining after the development makes the first resist layer 81.

The opening 81a of the first resist layer 81 has a wall face 81a1 including a portion corresponding to the sidewall SW1 of the first side shield 16C to be formed later, and a wall face 81a2 including a portion corresponding to the sidewall SW2 of the second side shield 16D to be formed later. In this step, the photoresist layer is patterned so that both the wall faces 81a1 and 81a2 become inclined with respect to the direction perpendicular to the top surface 1a (see FIG. 6 and FIG. 7) of the substrate 1 and that the distance between the portion of the wall face 81a1 corresponding to the sidewall SW1 and the portion of the wall face 81a2 corresponding to the sidewall SW2 decreases with decreasing distance to the top surface 1a of the substrate 1. Such patterning can be accomplished by using a photoresist layer that consists of a lower layer of low sensitivity and an upper layer of high sensitivity, for example.

Figure 11A:
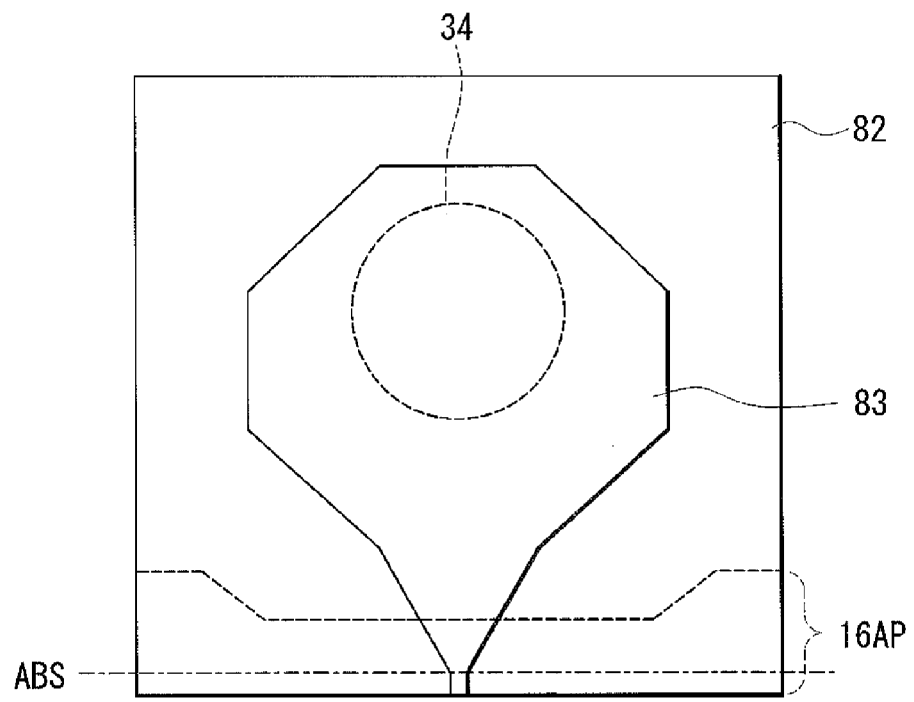
FIG. 11A and FIG. 11B are explanatory diagrams showing a step that follows the step shown in FIG. 10A and FIG. 10B.
Figure 11B:
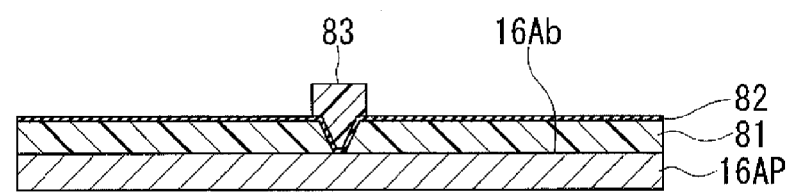

FIG. 11A and FIG. 11B show the next step. In this step, first, a separating film 82 of a nonmagnetic material is formed to cover the first resist layer 81. The separating film 82 is intended to prevent the first resist layer 81 of a positive photoresist from being mixed with a photoresist layer of a negative photoresist that will be formed later. The separating film 82 has a thickness in the range of 5 to 20 nm, for example. The separating film 82 may be formed of alumina or a synthetic resin, for example. Where alumina is selected as the material for the separating film 82, the separating film 82 is formed by ion beam deposition, for example.

Next, a second resist layer 83 is formed on the separating film 82 by patterning a photoresist layer of a negative photoresist by photolithography. The second resist layer 83 is shaped to correspond to the shape of the main pole 13 to be formed later. A method of forming the second resist layer 83 will now be described in detail. First, a photoresist layer of a negative photoresist is formed over the entire top surface of the stack. The photoresist layer is formed such that its top surface is higher in level than the top surface of a portion of the separating film 82 that lies on the first resist layer 81. Next, the photoresist layer is selectively exposed to light through a photomask. The photomask has a light-transmitting portion which passes the light for exposure therethrough, and a light-blocking portion which blocks the light for exposure, like the photomask that was used when forming the first resist layer 81. The light-transmitting portion of the photomask includes a portion shaped to correspond to the planar shape of the main pole 13 to be formed later. The exposed photoresist layer is then developed. As a result of the exposure, the area of the photoresist layer irradiated with the light having passed through the light-transmitting portion of the photomask becomes insoluble in a developing solution, while the other area remains soluble in the developing solution. The photoresist layer remaining after the development makes the second resist layer 83.

Figure 12A:
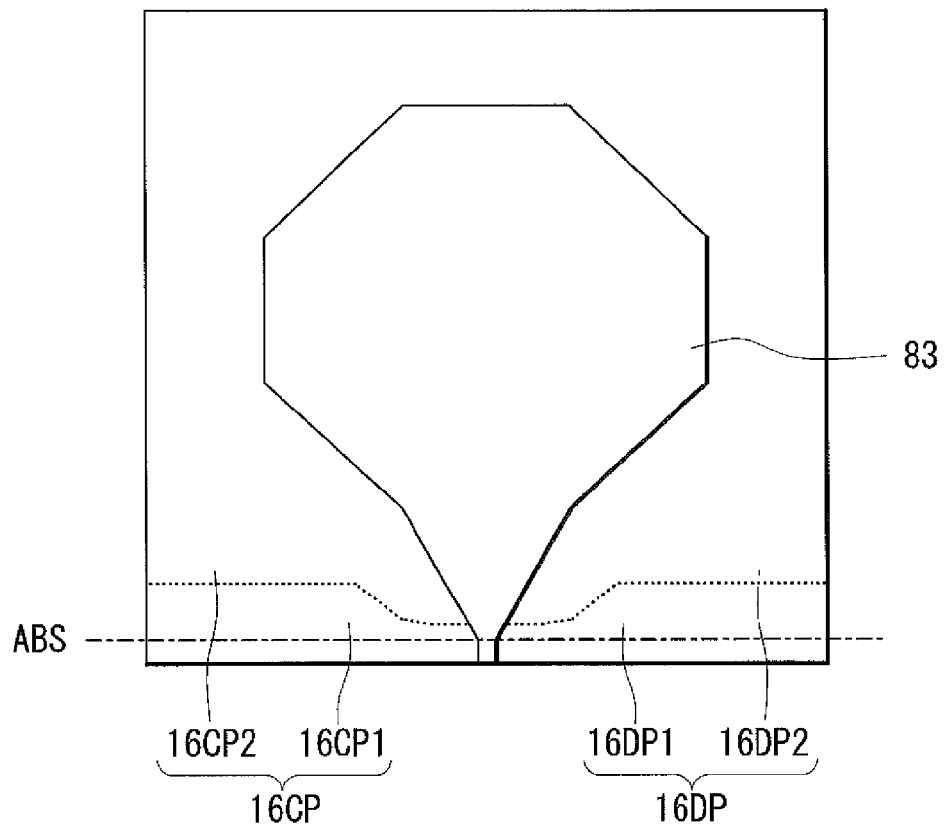
FIG. 12A and FIG. 12B are explanatory diagrams showing a step that follows the step shown in FIG. 11A and FIG. 11B.
Figure 12B:
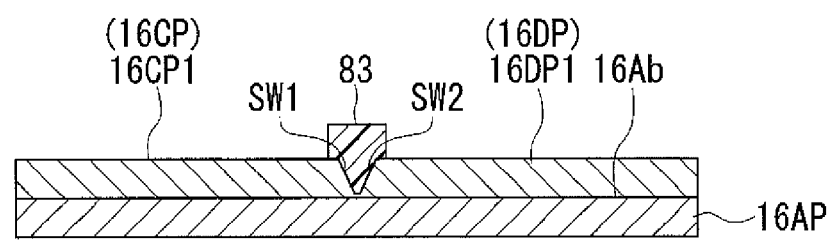

FIG. 12A and FIG. 12B show the next step. In this step, first, portions of the separating film 82 that are not covered with the second resist layer 83 are removed by wet etching, for example. Next, the first and second resist layers 81 and 83 are exposed to light and then the first resist layer 81 is removed. More specifically, first, the entire top surface of the stack is exposed to light. The exposure causes the first resist layer 81 of a positive photoresist to become soluble in a developing solution, and allows the second resist layer 83 of a negative photoresist to remain insoluble in the developing solution. Next, the first resist layer 81 is removed using an alkaline developing solution, for example. In this step, portions of the separating film 82 extending along the wall faces of the second resist layer 83 are also removed when or after the first resist layer 81 is removed. In this step, a portion of the separating film 82 lying under a narrow portion of the second resist layer 83 may also be removed. Even in such a case, the second resist layer 83 will not peel away since a portion of the separating film 82 lying under a thick portion of the second resist layer 83 remains.

Next, a first initial side shield 16CP, which will later become the first side shield 16C, and a second initial side shield 16DP, which will later become the second side shield 16D, are formed over the initial bottom shield 16AP and the initial nonmagnetic layer 55P by performing plating, using the non-illustrated seed layer as an electrode and a seed. The first initial side shield 16CP includes a first pre-side-shield portion 16CP1 to become the first side shield 16C, and a first portion to be removed 16CP2 which will be removed in an etching step to be described later. In FIG. 12A the boundary between the first pre-side-shield portion 16CP1 and the first portion to be removed 16CP2 is indicated in a dotted line. The first pre-side-shield portion 16CP1 has the first sidewall SW1 of the first side shield 16C to be formed later. The first portion to be removed 16CP2 has a fifth sidewall SW5 contiguous with the first sidewall SW1. The fifth sidewall SW5 has an edge E5 closest to the top surface 1a of the substrate 1. The edge E5 is contiguous with the first edge E1 of the first sidewall SW1. The fifth sidewall SW5 and the edges E1 and E5 are shown in FIG. 13D to be described later.

The second initial side shield 16DP includes a second pre-side-shield portion 16DP1 to become the second side shield 16D, and a second portion to be removed 16DP2 which will be removed in the etching step to be described later. In FIG. 12A the boundary between the second pre-side-shield portion 16DP1 and the second portion to be removed 16DP2 is indicated in a dotted line. The second pre-side-shield portion 16DP1 has the second sidewall SW2 of the second side shield 16D to be formed later. The second portion to be removed 16DP2 has a sixth sidewall SW6 contiguous with the second sidewall SW2. The sixth sidewall SW6 has an edge E6 closest to the top surface 1a of the substrate 1. The edge E6 is contiguous with the second edge E2 of the second sidewall SW2. The sixth sidewall SW6 and the edges E2 and E6 are shown in FIG. 13D to be described later. As shown in FIG. 12A, the first portion to be removed 16CP2 and the second portion to be removed 16DP2 are integral.

FIG. 13A to FIG. 13D show the next step. In FIG. 13D, the hatched potion represents a cross section of the initial nonmagnetic layer 55P parallel to the medium facing surface 80 to be formed later. In this step, first, the second resist layer 83 and the separating film 82 are removed. Next, a mask 84 is formed over the initial bottom shield 16AP, the first initial side shield 16CP and the second initial side shield 16DP. The mask 84 covers the first and second pre-side-shield portions 16CP1 and 16DP1 of the first and second initial side shields 16CP and 16DP. The mask 84 has a wall face 84a including a portion that defines the location of the first rear end face 16Cb of the first side shield 16C to be formed later and the location of the second rear end face 16Db of the second side shield 16D to be formed later. In FIG. 13D, the location ABS at which the medium facing surface 80 is to be formed is shown on the top surface of the mask 84.

The mask 84 may be formed by patterning a photoresist layer by photolithography. Alternatively, the mask 84 may be formed in the following manner. First, a photoresist layer is formed over the entire top surface of the stack. The photoresist layer is then cured by heating. Next, a hard layer of a metal material or an insulating material such as alumina is formed on the photoresist layer. A photoresist mask is then formed on the hard layer. Using the photoresist mask, the hard layer is then etched by, for example, ion beam etching, and patterned into an etching mask layer. The photoresist mask is then removed. Using the etching mask layer as a mask, the photoresist layer is then etched by, for example, reactive ion etching, and thereby patterned. The patterned photoresist layer and the etching mask layer constitute the mask 84.

FIG. 14A to FIG. 14D show the next step. In FIG. 14D, the location ABS at which the medium facing surface 80 is to be formed is shown on the top surface of the mask 84. In this step, portions of the first and second initial side shields 16CP and 16DP that are not covered with the mask 84 are etched by, for example, ion beam etching using the mask 84 so that the first and second portions to be removed 16CP2 and 16DP2 of the first and second initial side shields 16CP and 16DP are removed. This step will hereinafter be referred to as the etching step. In the etching step, a portion of the initial bottom shield 16AP that is not covered with the first and second initial side shields 16CP and 16DP and the mask 84 is etched at the same time the first and second initial side shields 16CP and 16DP are etched. The etching of the first and second initial side shields 16CP and 16DP in the etching step causes the first pre-side-shield portion 16CP1 to have the first rear end face 16Cb, and the second pre-side-shield portion 16DP2 to have the second rear end face 16Db. Further, the etching of the initial bottom shield 16AP forms the receiving section 16Ac in the initial bottom shield 16AP.

In the etching step, the receiving section 16Ac is formed in a self-aligned manner so that the third edge E3 of the third sidewall SW3 of the receiving section 16Ac coincides with the edge E5 of the fifth sidewall SW5 shown in FIG. 13D, and the fourth edge E4 of the fourth sidewall SW4 of the receiving section 16Ac coincides with the edge E6 of the sixth sidewall SW6 shown in FIG. 13D. As a result, the receiving section 16Ac is formed in precise alignment with the first and second pre-side-shield portions 16CP1 and 16DP1 so that the third edge E3 of the third sidewall SW3 is contiguous with the first edge E1 of the first sidewall SW1, and the fourth edge E4 of the fourth sidewall SW4 is contiguous with the second edge E2 of the second sidewall SW2.

Figure 14A:
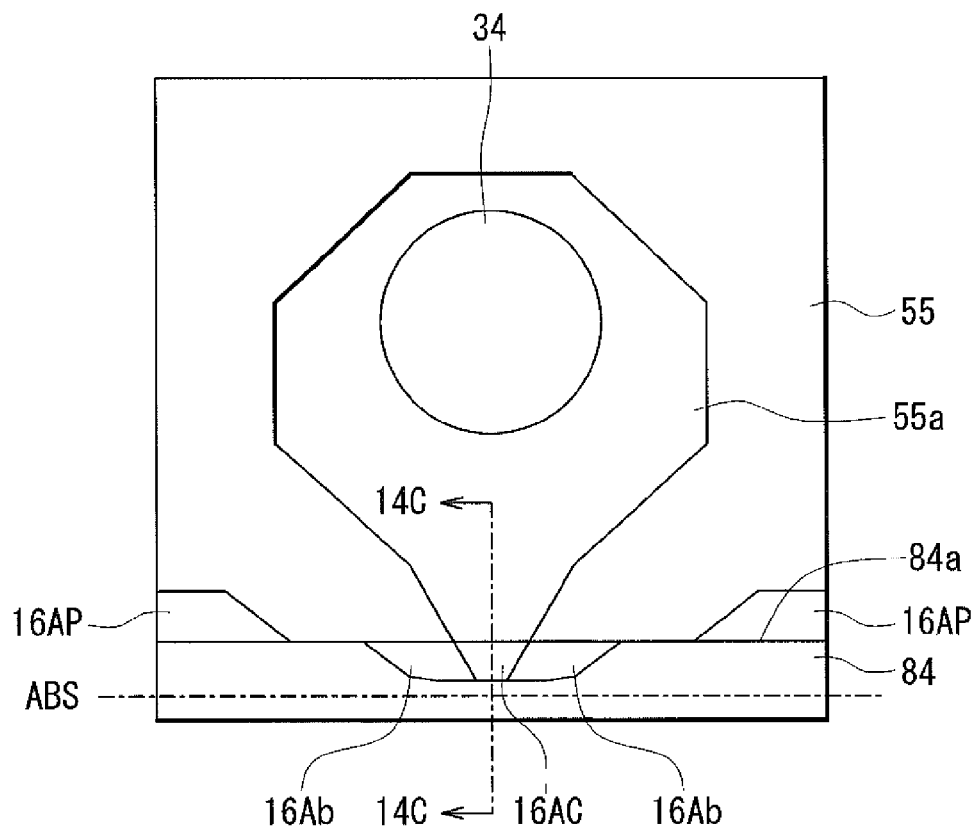
FIG. 14A to FIG. 14D are explanatory diagrams showing a step that follows the step shown in FIG. 13A to FIG. 13D.
Figure 14B:
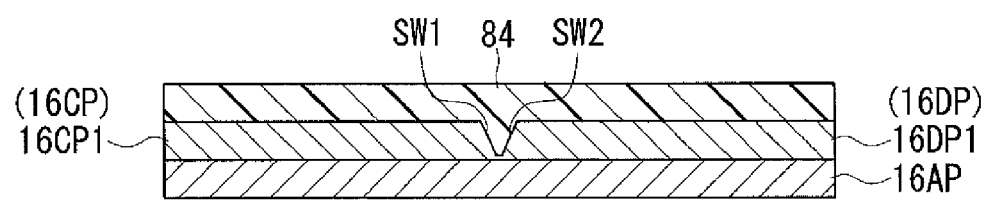
Figure 14C:
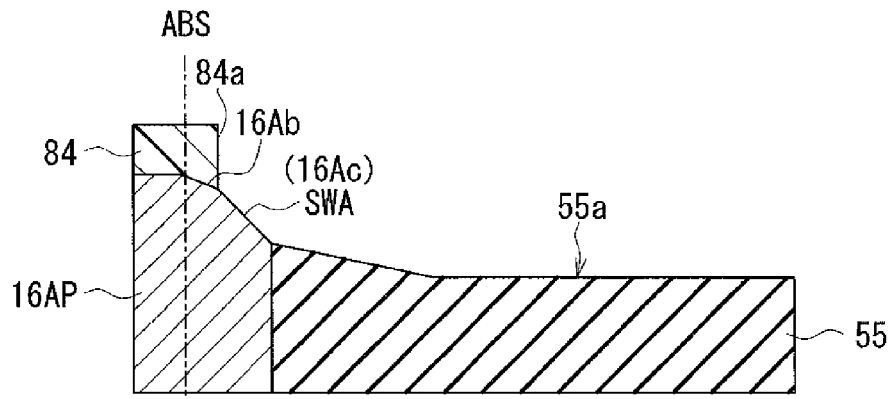
Figure 14D:
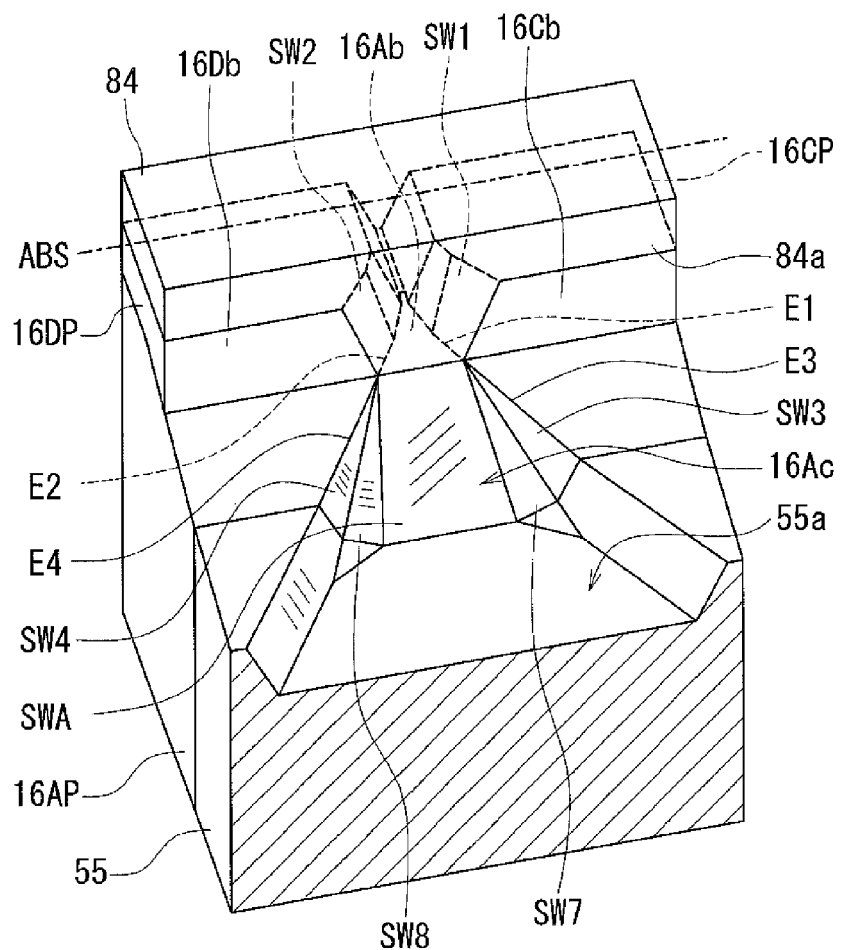

Further, in the etching step, a portion of the initial nonmagnetic layer 55P that is not covered with the first and second initial side shields 16CP and 16DP is etched so that the recess 55a described previously is formed in the initial nonmagnetic layer 55P. This makes the initial nonmagnetic layer 55P into the nonmagnetic layer 55. In FIG. 14D, the hatched portion represents a cross section of the nonmagnetic layer 55 parallel to the medium facing surface 80 to be formed later.

Where the etching step employs ion beam etching to etch the initial side shields 16CP and 16DP, the initial bottom shield 16AP and the initial nonmagnetic layer 55P, ion beams are projected in three directions, i.e., from the left side (the side of the first initial side shield 16CP), the right side (the side of the second initial side shield 16DP) and the bottom side (the side of the mask 84) in FIG. 14A toward the region where to form the receiving section 16Ac and the recess 55a, with the direction of travel of the ion beams prearranged to be at an angle of 40° to 75° with respect to the top surface 1a of the substrate 1. The ion beams may sweep. In such a case, the sweep angle may be 45°, for example.

Projecting an ion beam from the left side in FIG. 14A lowers the etching rate for the initial bottom shield 16AP and the initial nonmagnetic layer 55P in the vicinity of the first initial side shield 16CP because of the effect of the shadow of the first initial side shield 16CP. Projecting an ion beam from the right side in FIG. 14A lowers the etching rate for the initial bottom shield 16AP and the initial nonmagnetic layer 55P in the vicinity of the second initial side shield 16DP because of the effect of the shadow of the second initial side shield 16DP. Projecting an ion beam from the bottom side in FIG. 14A lowers the etching rate for the initial bottom shield 16AP in the vicinity of the mask 84 because of the effect of the shadow of the mask 84. As the etching of the first and second portions to be removed 16CP2 and 16DP2 proceeds to cause them to become smaller in thickness, the effects of the shadows of the first and second initial side shields 16CP and 16DP decrease to increase the aforementioned etching rates in the vicinity of the first and second initial side shields 16CP and 16DP. This results in the formation of the receiving section 16Ac having the front wall face SWA and the sidewalls SW3 and SW4 inclined as shown in FIG. 14D, and the recess 55a having the first and second wall faces inclined as shown in FIG. 14D.

Of the non-illustrated seed layer formed over the initial bottom shield 16AP and the initial nonmagnetic layer 55P, a portion not covered with the first and second initial side shields 16CP and 16DP and the mask 84 is also etched in the etching step. The depth (the dimension in the direction perpendicular to the top surface 1a of the substrate 1) of each of the receiving section 16Ac and the recess 55a can be controlled not only by the etching conditions but also by the thickness of the non-illustrated seed layer.

Figure 15A:
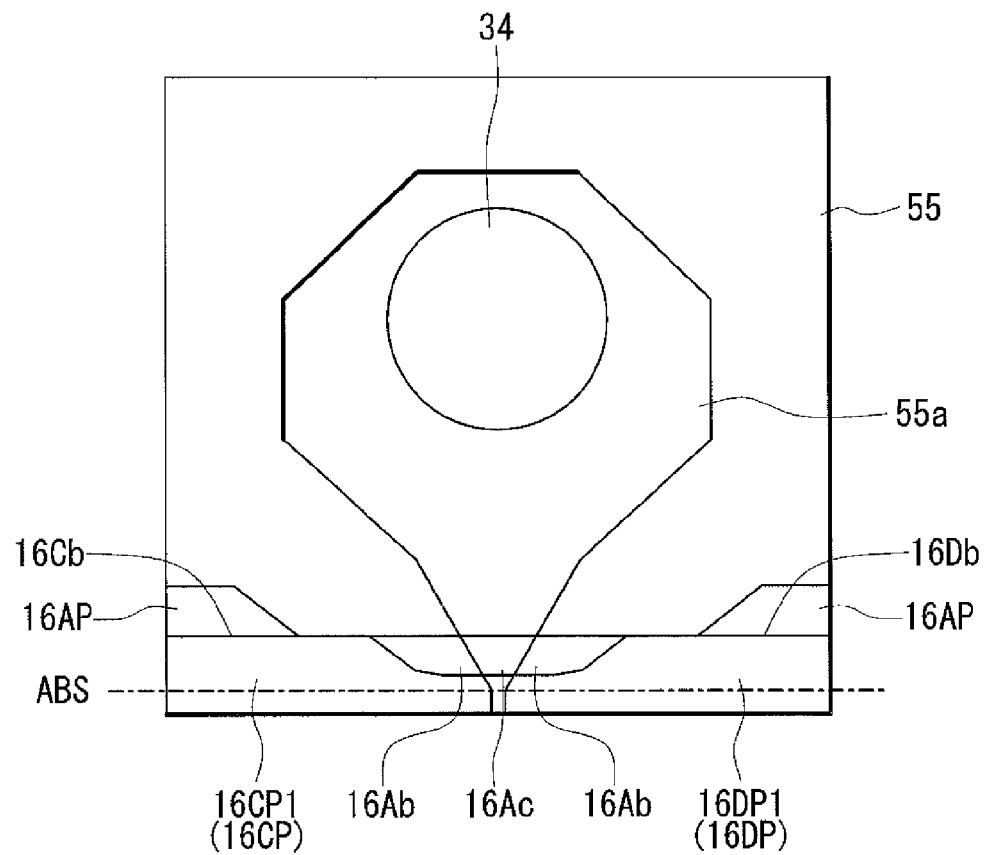
FIG. 15A and FIG. 15B are explanatory diagrams showing a step that follows the step shown in FIG. 14A to FIG. 14D.
Figure 15B:
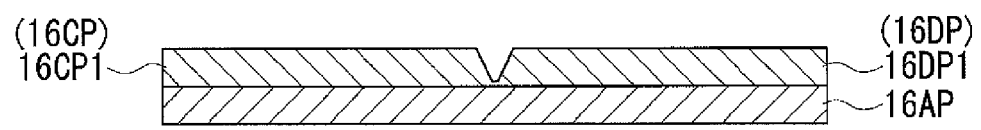
Figure 16A:
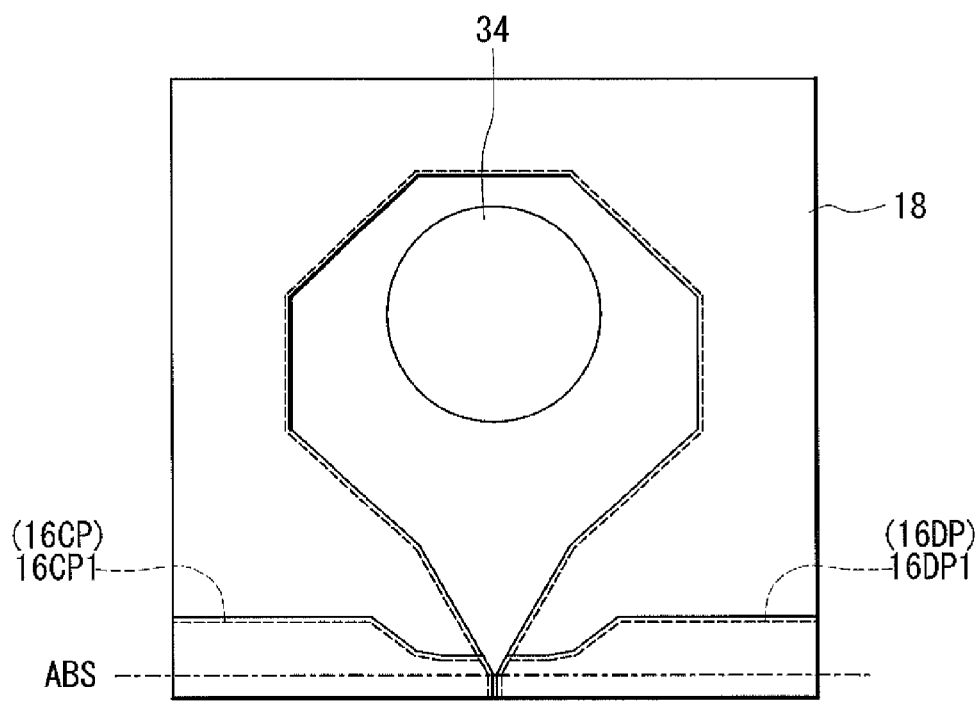
FIG. 16A and FIG. 16B are explanatory diagrams showing a step that follows the step shown in FIG. 15A and FIG. 15B.
Figure 16B:
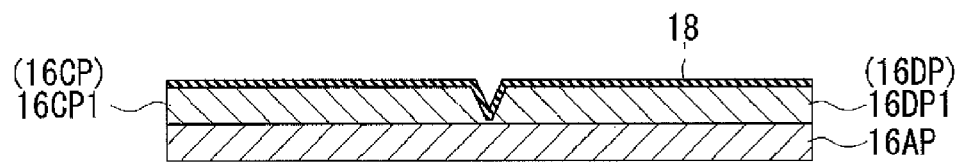

FIG. 15A and FIG. 15B show the next step. In this step, the mask 84 is removed. FIG. 16A and FIG. 16B show the next step. In this step, first, the first portion of the gap section 17 is formed. More specifically, the first gap layer 18 including the portion constituting the first portion of the gap section 17 is formed over the entire top surface of the stack. Where alumina is selected as the material of the first gap layer 18, the first gap layer 18 is formed by atomic layer deposition (ALD), for example. Where Ru is selected as the material of the first gap layer 18, the first gap layer 18 is formed by chemical vapor deposition (CVD), for example. Next, the first gap layer 18 is selectively etched to form therein an opening for exposing the top surface of the magnetic layer 34 (see FIG. 6) and an opening for exposing the top surface of the first connection layer (not illustrated).

Figure 17A:
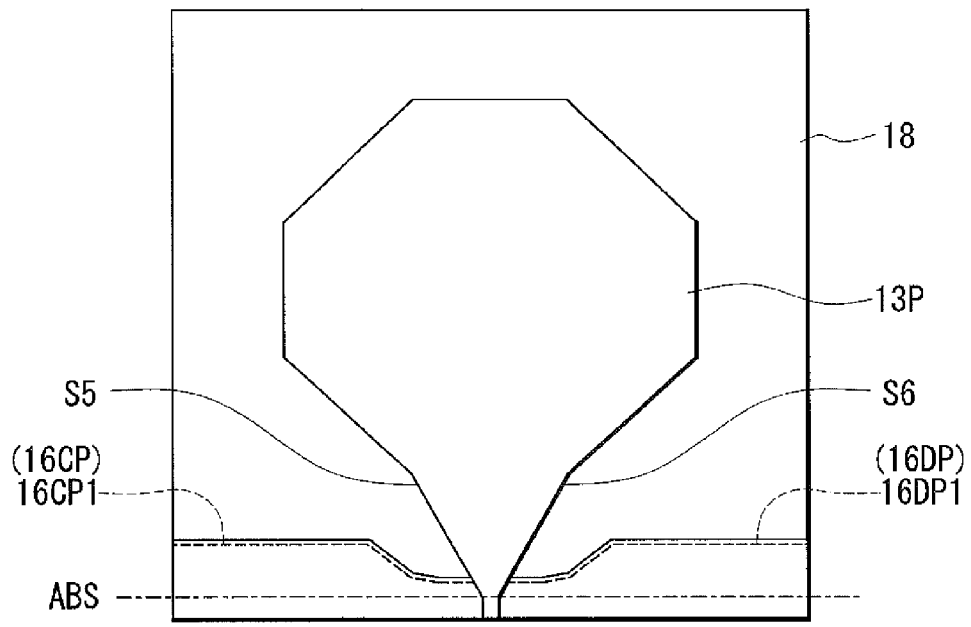
FIG. 17A and FIG. 17B are explanatory diagrams showing a step that follows the step shown in FIG. 16A and FIG. 16B.
Figure 17B:
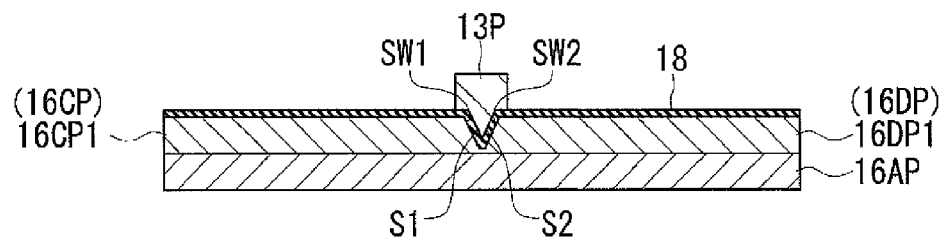

FIG. 17A and FIG. 17B show the next step. In this step, an initial main pole 13P, which will later become the main pole 13, is formed by frame plating, for example. Where frame plating is employed to form the initial main pole 13P, a photoresist layer is first formed over the entire top surface of the stack and then the photoresist layer is patterned by photolithography to form a frame (not illustrated). The frame is formed such that its top surface is higher in level than the top surface of the main pole 13 to be formed later. The frame has a first opening for receiving the initial main pole 13P and a second opening for receiving the second connection layer (not illustrated). The first opening has a first inner wall which defines the shape of the fifth side surface S5 of the rear portion 15B and a second inner wall which defines the shape of the sixth side surface S6 of the rear portion 15B. When viewed from above, the first and second inner walls are located outside the respective locations at which the first and second side surfaces S1 and S2 of the front portion 15A are to be formed.

Next, the initial main pole 13P is formed to be received in the first opening by performing plating using the frame. Portions of the initial main pole 13P that are formed to be received in the receiving section 16Ac and the recess 55a will later become the lower protrusion 14 of the main pole 13. A portion of the initial main pole 13P that is formed between the first sidewall SW1 of the first pre-side-shield portion 16CP1 and the second sidewall SW2 of the second pre-side-shield portion 16DP1 will later become the front portion 15A of the main body 15 of the main pole 13. A portion of the initial main pole 13P that lies on the portions to become the lower protrusion 14 and lies off the receiving section 16Ac and the recess 55a will later become the rear portion 15B of the main body 15 of the main pole 13.

The initial main pole 13P has the side surfaces S1 and S2 of the front portion 15A, the end faces 15Ba1 and 15Ba2 and side surfaces S5 and S6 (see FIG. 2) of the rear portion 15B, and the front end face 14a and side surfaces S3 and S4 (see FIG. 2) of the lower protrusion 14. The shape of the first side surface S1 is defined by the first sidewall SW1 of the first pre-side-shield portion 16CP1 and a portion of the first gap layer 18 extending along the first sidewall SW1. The shape of the second side surface S2 is defined by the second sidewall SW2 of the second pre-side-shield portion 16DP1 and a portion of the first gap layer 18 extending along the second sidewall SW2.

The shape of the first end face 15Ba1 is defined by the first rear end face 16Cb of the first pre-side-shield portion 16CP1 shown in FIG. 14D and FIG. 15A and a portion of the first gap layer 18 extending along the first rear end face 16Cb. The shape of the second end face 15Ba2 is defined by the second rear end face 16Db of the second pre-side-shield portion 16DP1 shown in FIG. 14D and FIG. 15A and a portion of the first gap layer 18 extending along the second rear end face 16Db. The shape of the fifth side surface S5 is defined by the first inner wall of the frame. The shape of the sixth side surface S6 is defined by the second inner wall of the frame.

The shape of the front end face 14a is defined by the front wall face SWA of the receiving section 16Ac shown in FIG. 14D and a portion of the first gap layer 18 extending along the front wall face SWA. The shape of the third side surface S3 is defined by the third sidewall SW3 of the receiving section 16Ac shown in FIG. 14D and a portion of the first gap layer 18 extending along the third sidewall SW3. The shape of the fourth side surface S4 is defined by the fourth sidewall SW4 of the receiving section 16Ac shown in FIG. 14D and a portion of the first gap layer 18 extending along the fourth sidewall SW4.

The second connection layer is formed on the first connection layer by performing plating using the frame. The initial main pole 13P and the second connection layer are formed such that their top surfaces are higher in level than the top surfaces of portions of the first gap layer 18 lying on the initial side shields 16CP and 16DP. The frame is then removed.

Reference is now made to FIG. 1, FIG. 4, FIG. 6 and FIG. 7 to describe steps to follow the formation of the initial main pole 13P and the second connection layer. First, the nonmagnetic layer 60 is formed over the entire top surface of the stack. The initial main pole 13P, the second connection layer, the first gap layer 18 and the nonmagnetic layer 60 are then polished until the top surfaces of the first and second initial side shields 16CP and 16DP are exposed. Next, the nonmagnetic metal layer 58 and the insulating layer 59 are formed over the initial main pole 13P and the initial side shields 16CP and 16DP. The initial main pole 13P, the initial side shields 16CP and 16DP, the first gap layer 18 and the nonmagnetic layer 60 are then etched in part by, for example, ion beam etching using the nonmagnetic metal layer 58 and the insulating layer 59 so that the initial main pole 13P is provided with the inclined portion of the top surface 15Ab of the front portion 15A. Of the top surface of the etched initial main pole 13P, a portion covered with the nonmagnetic metal layer 58 and the insulating layer 59 will form the flat portion of the top surface 15Ab of the front portion 15A and the top surface 15Bb of the rear portion 15B.

Next, the second portion of the gap section 17 is formed. More specifically, the second gap layer 19 including the portion constituting the second portion of the gap section 17 is formed over the entire top surface of the stack by sputtering or chemical vapor deposition, for example. The second gap layer 19, the nonmagnetic metal layer 58 and the insulating layer 59 are then selectively etched by, for example, ion beam etching, so that a portion of the top surface of the initial main pole 13P, a portion of the top surface of each of the initial side shields 16CP and 16DP, and the top surface of the second connection layer are exposed. Next, an initial top shield, which will later become the top shield 16B, is formed over the initial side shields 16CP and 16DP and the second gap layer 19, and the magnetic layer 41 is formed on the initial main pole 13P, by frame plating, for example.

Next, the insulating film 61 is formed over the entire top surface of the stack. The insulating film 61 is then selectively etched to form therein an opening for exposing the top surface of the second connection layer. Next, the second portion 20 of the coil is formed by frame plating, for example. The insulating layer 62 is then formed in the space between adjacent turns of the second portion 20. Next, a nonmagnetic layer (not illustrated) is formed over the entire top surface of the stack. The insulating film 61 and the nonmagnetic layer are then polished by, for example, CMP, until the second portion 20, the initial top shield and the magnetic layer 41 are exposed.

Next, the insulating layer 63 is formed over the entire top surface of the stack. The insulating layer 63 is then selectively etched to form therein an opening for exposing the top surface of the initial top shield and an opening for exposing the top surface of the magnetic layer 41. Next, the magnetic layer 42 is formed by frame plating, for example. The initial top shield and the magnetic layer 42 are then etched by, for example, reactive ion etching or ion beam etching so as to provide the initial top shield with the connecting surface 16Bc mentioned previously and provide the magnetic layer 42 with the end face mentioned previously. Next, the nonmagnetic layer 64 is formed over the entire top surface of the stack. The nonmagnetic layer 64 is then polished by, for example, CMP, until the magnetic layer 42 is exposed.

Next, the protective layer 70 is formed to cover the entire top surface of the stack. Wiring, terminals and other components are then formed on the protective layer 70, and the substrate 1 is cut near the location ABS at which the medium facing surface 80 is to be formed. The cut surface is then polished into the medium facing surface 80 so that the initial bottom shield 16AP becomes the bottom shield 16A, the first initial side shield 16CP becomes the first side shield 16C, the second initial side shield 16DP becomes the second side shield 16D, the initial main pole 13P becomes the main pole 13, and the initial top shield becomes the top shield 16B. Then, fabrication of flying rails and other processes are performed to complete the magnetic head.

The specific functions and effects of the magnetic head according to the present embodiment will now be described. In the magnetic head according to the present embodiment, as shown in FIG. 5, the receiving section 16Ac is precisely aligned with the first and second side shields 16C and 16D so that the third edge E3 of the third sidewall SW3 is contiguous with the first edge E1 of the first sidewall SW1 and the fourth edge E4 of the fourth sidewall SW4 is contiguous with the second edge E2 of the second sidewall SW2. Consequently, the lower protrusion 14 of the main pole 13 is also precisely aligned with the first and second side shields 16C and 16D.

In the method of manufacturing the magnetic head according to the present embodiment, the receiving section 16Ac and the lower protrusion 14 are formed in a self-aligned manner by using the first and second initial side shields 16CP and 16DP. This will be described in detail below. In the present embodiment, the portions of the first and second initial side shields 16CP and 16DP not covered with the mask 84 and the portion of the initial bottom shield 16AP not covered with the first and second initial side shields 16CP and 16DP and the mask 84 are etched in the etching step so that the first and second portions to be removed 16CP2 and 16DP2 of the first and second initial side shields 16CP and 16DP are removed and the receiving section 16Ac is formed in the initial bottom shield 16AP.

As shown in FIG. 13D, the first portion to be removed 16CP2 has the fifth sidewall SW5 contiguous with the first sidewall SW1, and the second portion to be removed 16DP2 has the sixth sidewall SW6 contiguous with the second sidewall SW2. In the etching step, as described previously, the receiving section 16Ac is formed such that the third edge E3 of the third sidewall SW3 of the receiving section 16Ac coincides with the edge E5 of the fifth sidewall SW5 closest to the top surface 1a of the substrate 1 and the fourth edge E4 of the fourth sidewall SW4 of the receiving section 16Ac coincides with the edge E6 of the sixth sidewall SW6 closest to the top surface 1a of the substrate 1. As a result, the receiving section 16Ac is formed in precise alignment with the first and second side shields 16C and 16D (the first and second pre-side-shield portions 16CP1 and 16DP1) so that the third edge E3 of the third sidewall SW3 is contiguous with the first edge E1 of the first sidewall SW1 and the fourth edge E4 of the fourth sidewall SW4 is contiguous with the second edge E2 of the second sidewall SW2. Further, the initial main pole 13P is formed such that a portion thereof is received in the receiving section 16Ac. As a result, the main pole 13 is also formed in precise alignment with the first and second side shields 16C and 16D.

Now, the effects of the magnetic head according to the present embodiment and the manufacturing method thereof will be described in comparison with a magnetic head of a comparative example and a manufacturing method thereof. First, a description will be given of the magnetic head of the comparative example and the manufacturing method thereof. Like the magnetic head according to the present embodiment, the magnetic head of the comparative example includes a medium facing surface, a main pole, a write shield, a gap section and a nonmagnetic layer, the write shield including a bottom shield, a top shield, a first side shield and a second side shield, the gap section including a first portion and a second portion. In the magnetic head of the comparative example, the main pole includes a lower protrusion, the lower protrusion having a front end face facing toward the medium facing surface. In the magnetic head of the comparative example, however, the bottom shield does not include a receiving section.

In the method of manufacturing the magnetic head of the comparative example, the main pole is formed in the following manner. First, as in the method of manufacturing the magnetic head according to the present embodiment, parts of the magnetic head are formed on a substrate up to the initial bottom shield and the initial nonmagnetic layer. Then, a mask having an opening shaped to correspond to the planar shape of the lower protrusion of the main pole is formed over the initial bottom shield and the initial nonmagnetic layer. The mask is formed by patterning a photoresist layer by photolithography. Using the mask, the initial nonmagnetic layer is then etched to form therein a recess for receiving the entire lower protrusion of the main pole. This makes the initial nonmagnetic layer into the nonmagnetic layer. The mask is then removed.

Next, first and second initial side shields, which will later become the first and second side shields, respectively, of the comparative example are formed on the top surface of the initial bottom shield. The first initial side shield of the comparative example corresponds to the first initial side shield 16CP of the present embodiment without the first portion to be removed 16CP2. The second initial side shield of the comparative example corresponds to the second initial side shield 16DP of the present embodiment without the second portion to be removed 16DP2.

Next, the first portion of the gap section is formed as in the step shown in FIG. 16A and FIG. 16B. Next, an initial main pole is formed by frame plating as in the step shown in FIG. 17A and FIG. 17B. In the method of manufacturing the magnetic head of the comparative example, a portion of the initial main pole that is formed to be received in the recess of the nonmagnetic layer makes the lower protrusion. The subsequent steps are the same as those of the manufacturing method of the magnetic head according to the present embodiment.

In the manufacturing method of the magnetic head of the comparative example, alignment between the lower protrusion and the first and second side shields depends on the position accuracy of the mask formed by photolithography. This manufacturing method suffers misalignment between the lower protrusion and the first and second side shields. If the structure of the magnetic head of the comparative example to be manufactured by this manufacturing method is such that the front end face of the lower protrusion is located near the medium facing surface, the occurrence of the aforementioned misalignment would bring the lower protrusion closer to one of the side shields, which would result in leakage of magnetic flux from the lower protrusion to the one of the side shields. Consequently, it is difficult with the magnetic head of the comparative example to achieve both of the following two goals at the same time, the two goals being important for improvement of recording density. A first goal is to provide a main pole that is shaped to be small in the end face located in the medium facing surface and large in the area of a cross section (hereinafter referred to as cross-sectional area) parallel to the medium facing surface in the vicinity of the medium facing surface. A second goal is to reduce leakage of magnetic flux from the main pole to the write shield.

In contrast, according to the present embodiment, since the receiving section 16Ac is formed in precise alignment with the first and second side shields 16C and 16D, the lower protrusion 14 of the main pole 13 is also formed in precise alignment with the first and second side shields 16C and 16D, as mentioned previously. The present embodiment thus allows the front end face 14a of the lower protrusion 14 to be located near the medium facing surface 80 while preventing leakage of magnetic flux from the lower protrusion 14 to one of the side shields that results from misalignment of the lower protrusion 14. The present embodiment is thus able to achieve both of the aforementioned two goals at the same time. Consequently, according to the present embodiment, it is possible to achieve improved overwrite property, reduced error rate and higher recording density.

Bringing the front end face 14a of the lower protrusion 14 near the medium facing surface 80 allows for reducing leakage of magnetic flux from the main pole 13 to the outside of the main pole 13 and thereby improving overwrite property. For the magnetic head of the comparative example, however, any attempts to bring the front end face of the lower protrusion near the medium facing surface should result in reduction in the volume of the bottom shield, thereby causing the bottom shield to be prone to flux saturation. In such a case, there arises the problem of flux leakage from the bottom shield to the recording medium, which gives rise to unwanted erasure.

In the present embodiment, in contrast, the receiving section 16Ac is formed in the bottom shield 16A and receives a portion of the lower protrusion 14. This makes it possible to provide the bottom shield 16A with a sufficient volume to prevent flux saturation, while allowing the front end face 14a of the lower protrusion 14 to be located near the medium facing surface 80. The present embodiment is thus able to reduce flux leakage from the main pole 13 to the outside of the main pole 13 and also from the bottom shield 16A toward the recording medium 90. According to the present embodiment, this also contributes to improved overwrite property, reduced error rate, and higher recording density.

The other effects of the present embodiment will now be described. In the present embodiment, the front end face 14a of the lower protrusion 14 is inclined with respect to the medium facing surface 80, as described previously. If the front end face 14a is parallel to the medium facing surface 80, corners with an angle of 90° or close thereto are formed between the front end face 14a and the bottom end 15Ac of the front portion 15A and between the front end face 14a and the bottom surface 14b of the lower protrusion 14. In such a case, flux leakage from the main pole 13 to the outside of the main pole 13 is more likely to occur at these corners. In the present embodiment, in contrast, the angle of the corner formed between the front end face 14a and the bottom end 15Ac and the angle of the corner formed between the front end face 14a and the bottom surface 14b are greater than in the aforementioned case. Flux leakage from the main pole 13 to the outside of the main pole 13 is thus reduced in the present embodiment when compared with the case where the front end face 14a is parallel to the medium facing surface 80. According to the present embodiment, this also contributes to improvement in overwrite property.

Further, in the present embodiment, the top surface 16Ab of the bottom shield 16A is inclined with respect to the direction perpendicular to the medium facing surface 80, as mentioned previously. As a result, the bottom end 15Ac of the front portion 15A is also inclined with respect to the direction perpendicular to the medium facing surface 80. Consequently, the cross-sectional area of the front portion 15A in the vicinity of the medium facing surface 80 is greater in the present embodiment than in the case where the bottom end 15Ac extends substantially perpendicular to the medium facing surface 80. According to the present embodiment, this also contributes to improvement in overwrite property.

In the present embodiment, in particular, the bottom end 15Ac of the front portion 15A and the front end face 14a of the lower protrusion 14 are both inclined with respect to the direction perpendicular to the medium facing surface 80, and the front end face 14a forms a greater angle with respect to the direction perpendicular to the medium facing surface 80 than does the bottom end 15Ac. The present embodiment thereby achieves a greater cross-sectional area of the main pole 13 in the vicinity of the medium facing surface 80 while reducing flux leakage from the main pole 13 to the outside of the main pole 13. Consequently, the present embodiment allows for more efficient improvement of overwrite property.

Further, in the present embodiment, the distance between the third edge E3 and the fourth edge E4 in the track width direction TW increases with increasing distance from the medium facing surface 80. When compared with a case where the distance between the third edge E3 and the fourth edge E4 in the track width direction TW is constant regardless of distance from the medium facing surface 80, the present embodiment allows the receiving section 16Ac to have a greater cross-sectional area at a location away from the first and second side shields 16C and 16D, and consequently allows the lower protrusion 14 to have a greater cross-sectional area in the vicinity of the medium facing surface 80. According to the present embodiment, this also contributes to improvement in overwrite property.

Further, in the present embodiment, the side shield height SH shown in FIG. 4 is equal to the distance from the medium facing surface 80 to each of the edges EA and EB of the first and second rear end faces 16Cb and 16Db, the edges EA and EB being farthest from the top surface 1a of the substrate 1. The location of the edges EA and EB is defined by the location of the wall face 84a of the mask 84 shown in FIG. 13A to FIG. 14D. In the present embodiment, it is easy to bring the location of the wall face 84a close to the location ABS at which the medium facing surface 80 is to be formed.

The distance from the medium facing surface 80 to the boundary between the front portion 15A and the rear portion 15B on the top surface of the main pole 13, that is, the length of the front portion 15A in the direction perpendicular to the medium facing surface 80, will be defined as the neck height in the present embodiment. According to the present embodiment, it is possible to reduce the neck height by reducing the side shield height SH.

If the edges EA and EB of the first and second rear end faces 16Cb and 16Db are inclined with respect to the medium facing surface 80, the cross-sectional area of the rear portion 15B at the boundary between the front portion 15A and the rear portion 15B is limited by the first and second rear end faces 16Cb and 16Db. In the present embodiment, in contrast, since the edges EA and EB of the first and second rear end faces 16Cb and 16Db are parallel to the medium facing surface 80, the cross-sectional area of the rear portion 15B at the boundary between the front portion 15A and the rear portion 15B can be increased without being limited by the first and second rear end faces 16Cb and 16Db.

Further, in the present embodiment, in any cross section that intersects the rear portion 15B and is parallel to the medium facing surface 80, the rear portion 15B has a greater width in the track width direction TW than the lower protrusion 14. The present embodiment allows the rear portion 15B to have a greater cross-sectional area in the vicinity of the medium facing surface 80 when compared with the case where the rear portion 15B has the same width in the track width direction TW as the lower protrusion 14 in the aforementioned cross section. According to the present embodiment, this also contributes to improvement in overwrite property.

Further, in the present embodiment, in any cross section that intersects the first and second sidewalls SW1 and SW2 and is parallel to the medium facing surface 80, the distance between the first sidewall SW1 and the second sidewall SW2 in the track width direction TW decreases with decreasing distance to the top surface 1a of the substrate 1. As a result, the main pole 13 of the present embodiment is such that in the aforementioned cross section the distance between the first side surface S1 and the second side surface S2 decreases with decreasing distance to the top surface 1a of the substrate 1, and the width in the track width direction TW of the end face 15Aa of the front portion 15A or the end face 13a of the main pole 13 decreases with decreasing distance to the top surface 1a of the substrate 1. The present embodiment thereby makes it possible to prevent the occurrence of unwanted erasure induced by a skew.

Further, in the present embodiment, the first rear end face 16Cb forms a smaller angle with respect to the direction perpendicular to the top surface 1a of the substrate 1 than does the first sidewall SW1, and the second rear end face 16Db forms a smaller angle with respect to the direction perpendicular to the top surface 1a of the substrate 1 than does the second sidewall SW2. As a result, in the main pole 13 of the present embodiment, the first end face 15Ba1 forms a smaller angle with respect to the direction perpendicular to the top surface 1a of the substrate 1 than does the first side surface S1, and the second end face 15Ba2 forms a smaller angle with respect to the direction perpendicular to the top surface 1a of the substrate 1 than does the second side surface S2. The main pole 13 of the present embodiment can be greater in cross-sectional area in the vicinities of the boundary between the first side surface S1 and the first end face 15Ba1 and the boundary between the second side surface S2 and the second end face 15Ba2 when compared with the case where the first end face 15Ba1 forms the same angle as the first side surface S1 with respect to the direction perpendicular to the top surface 1a of the substrate 1 and the second end face 15Ba2 forms the same angle as the second side surface S2 with respect to the direction perpendicular to the top surface 1a of the substrate 1. According to the present embodiment, this also contributes to improvement in overwrite property.

Second Embodiment

Figure 18:
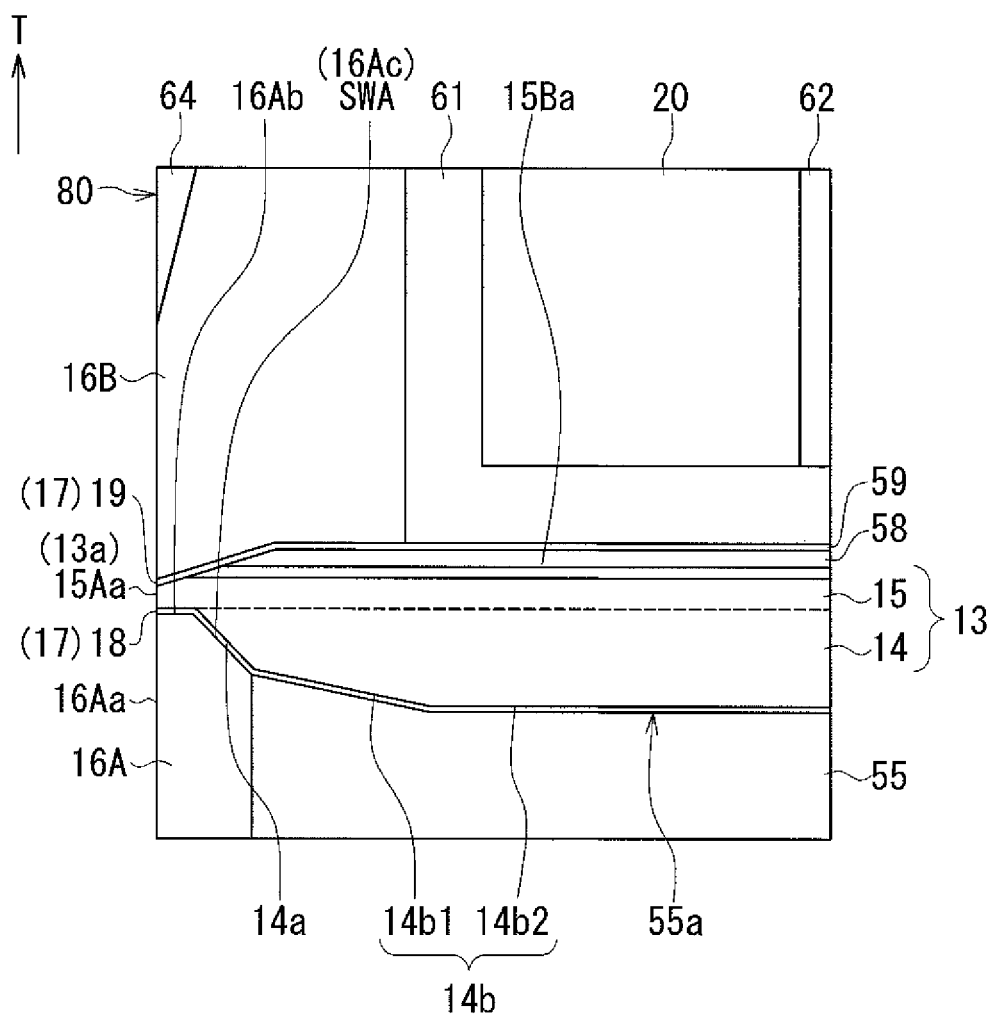
FIG. 18 is a cross-sectional view showing the main part of a magnetic head according to a second embodiment of the invention.

A magnetic head according to a second embodiment of the invention will now be described with reference to FIG. 18. FIG. 18 is a cross-sectional view showing the main part of the magnetic head according to the present embodiment. In the present embodiment, the top surface 16Ab of the bottom shield 16A extends in a direction substantially perpendicular to the medium facing surface 80.

The present embodiment cannot provide the effect resulting from the configuration in which the top surface 16Ab of the bottom shield 16A is inclined, which has been described in the first embodiment section. The remainder of configuration, function and effects of the present embodiment are similar to those of the first embodiment.

Third Embodiment

Figure 19:
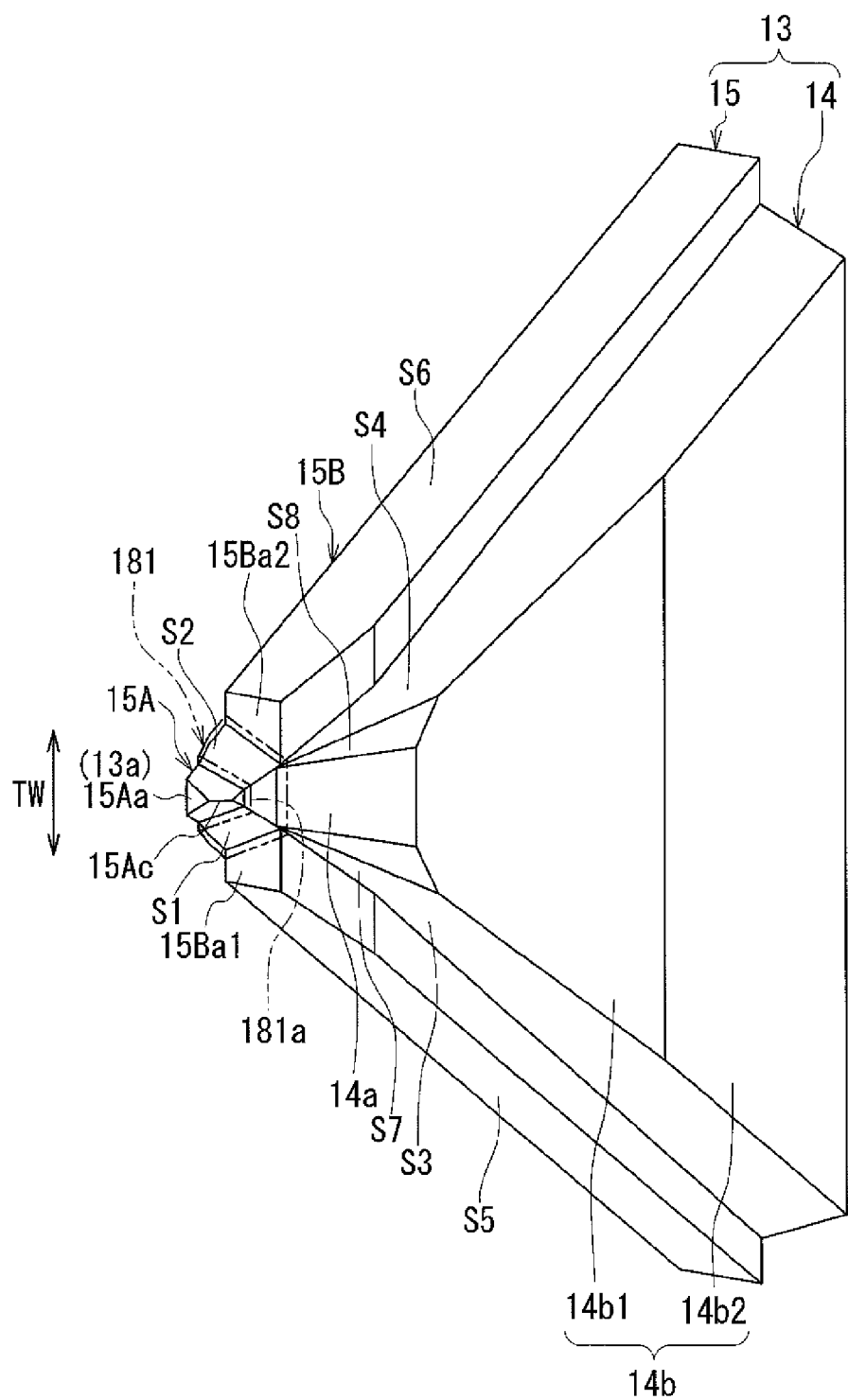
FIG. 19 is a perspective view of the main pole of a magnetic head according to a third embodiment of the invention.
Figure 20:
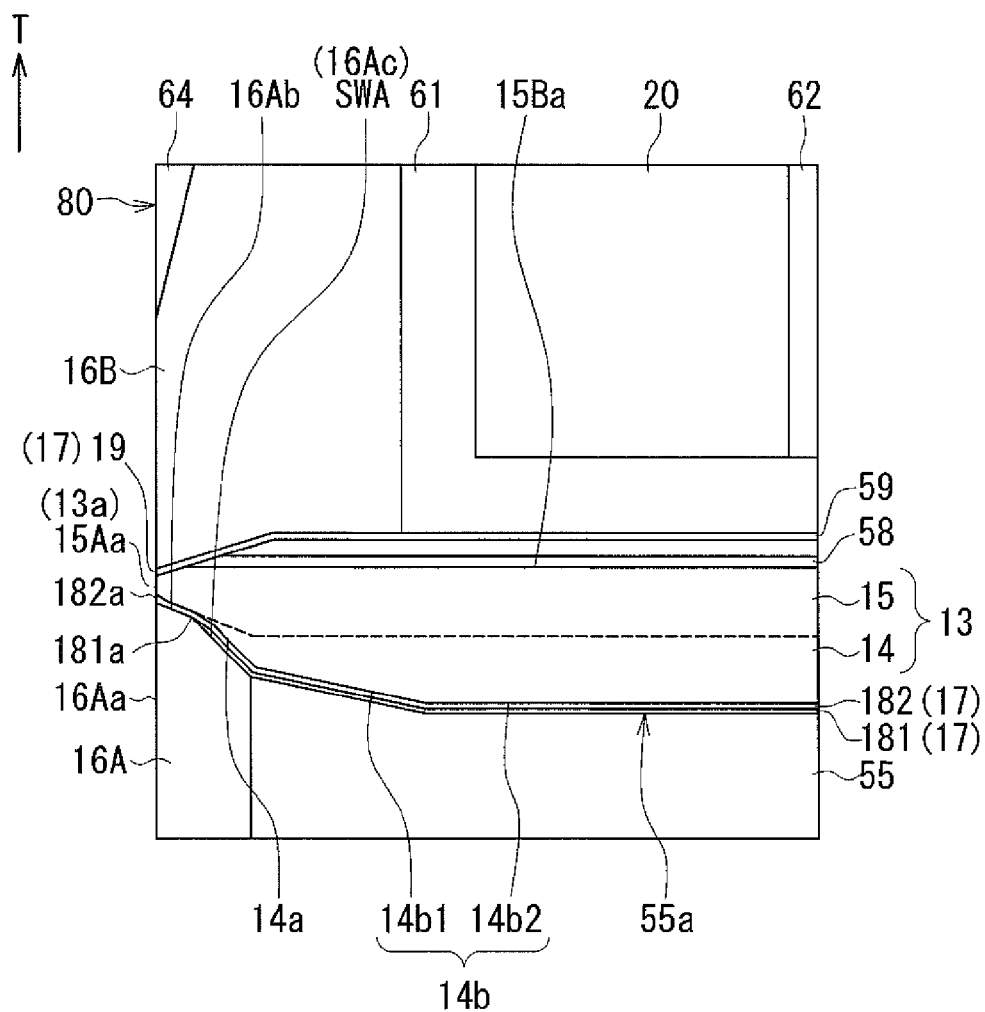
FIG. 20 is a cross-sectional view showing the main part of the magnetic head according to the third embodiment of the invention.
Figure 21:
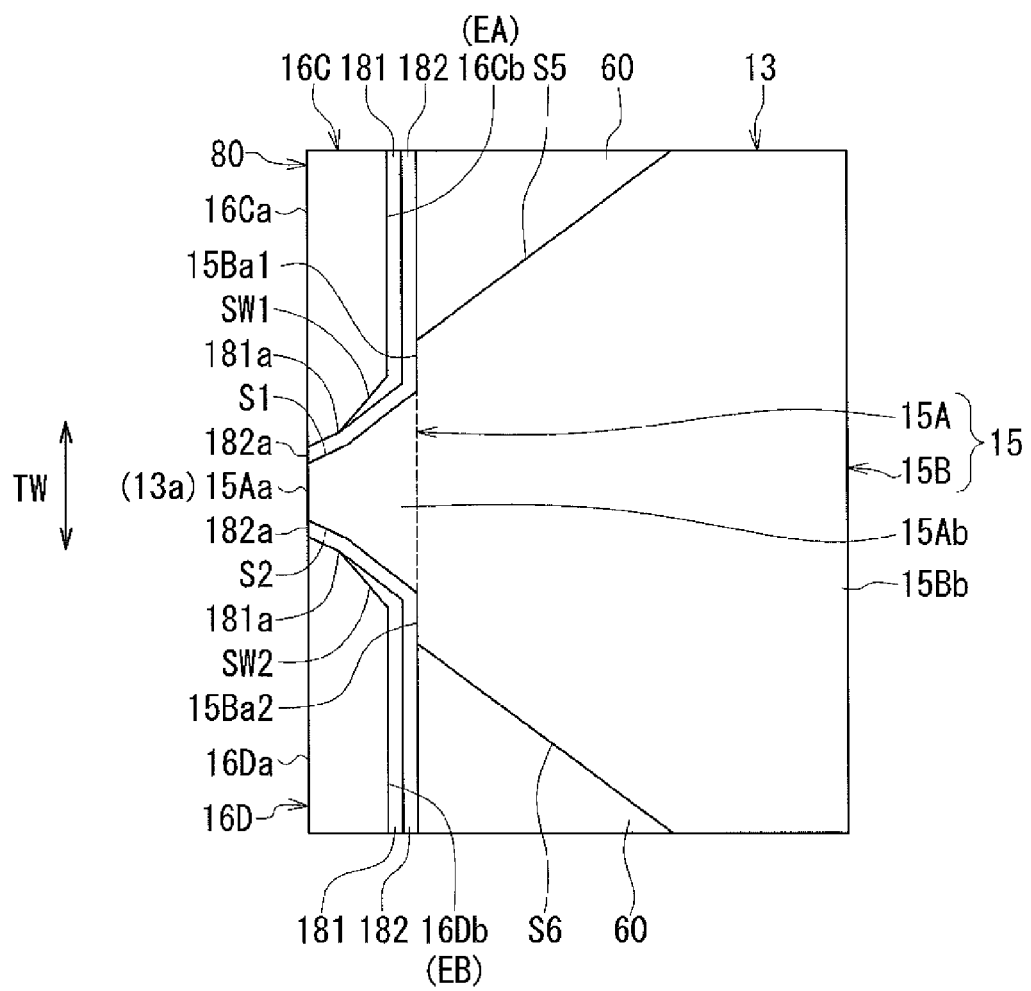
FIG. 21 is a plan view showing the main pole, the first side shield and the second side shield of the magnetic head according to the third embodiment of the invention.

A magnetic head according to a third embodiment of the invention will now be described with reference to FIG. 19 to FIG. 21. FIG. 19 is a perspective view of the main pole of the magnetic head according to the present embodiment. FIG. 20 is a cross-sectional view showing the main part of the magnetic head according to the present embodiment. FIG. 21 is a plan view showing the main pole, the first side shield and the second side shield of the magnetic head according to the present embodiment. The magnetic head according to the present embodiment is configured differently than the first embodiment in the following ways. The magnetic head according to the present embodiment does not include the first gap layer 18 of the first embodiment. Instead, the first portion of the gap section 17 includes a first gap film 181 and a second gap film 182 described below.

The first gap film 181 has an end 181a closest to the medium facing surface 80 and located at a distance from the medium facing surface 80. The distance from the medium facing surface 80 to the end 181a is, for example, 30 to 200 nm, and preferably falls within the range of 60 to 100 nm. At least a portion of the first gap film 181 is located in the receiving section 16Ac of the bottom shield 16A. The end 181a of the first gap film 181 may be located closer to the medium facing surface 80 than is the receiving section 16Ac or may be located in the receiving section 16Ac.

In the present embodiment, as shown in FIG. 20 and FIG. 21, the first gap film 181 is disposed along the first sidewall SW1 and the first rear end face 16Cb of the first side shield 16C, the second sidewall SW2 and the second rear end face 16Db of the second side shield 16D, the top surface 16Ab of the bottom shield 16A, the front wall face SWA of the receiving section 16Ac, and the surface of the recess 55a of the nonmagnetic layer 55. The first gap film 181 is further disposed along the third sidewall SW3, the fourth sidewall SW4, the third connecting surface SW7 and the fourth connecting surface SW8 of the receiving section 16Ac which are shown in FIG. 5 relating to the first embodiment.

The second gap film 182 is stacked on the first gap film 181 and has an end 182a located in the medium facing surface 80. In the present embodiment, as shown in FIG. 20 and FIG. 21, the second gap film 182 is disposed along the first sidewall SW1 of the first side shield 16C, the second sidewall SW2 of the second side shield 16D and the first gap film 181, and covers the first gap film 181.

In the present embodiment, as shown in FIG. 20, the main pole 13 is disposed over the bottom shield 16A and the nonmagnetic layer 55 with the first and second gap films 181 and 182 interposed between the main pole 13 and each of the bottom shield 16A and the nonmagnetic layer 55. Further, as shown in FIG. 21, the first and second gap films 181 and 182 are interposed also between the main pole 13 and each of the first and second side shields 16C and 16D. In the present embodiment, the first and second gap films 181 and 182 are interposed between the main pole 13 and each of the first to fourth sidewalls SW1 to SW4. FIG. 19 shows a portion of the first gap film 181 that is interposed between the second gap film 182 and the first and second sidewalls SW1 and SW2.

The first gap film 181 is formed of alumina, for example. The second gap film 182 is formed of, for example, the same material as the first gap layer 18 which has been described in the first embodiment section. The first gap film 181 has a thickness in the range of, for example, 20 to 80 nm, and preferably in the range of 40 to 60 nm. The second gap film 182 has a thickness in the range of, for example, 20 to 80 nm, and preferably in the range of 30 to 60 nm.

The shape and location of the first gap film 181 are not limited to the above-described example. For example, the whole of the first gap film 181 may be located in the receiving section 16Ac. In such a case, only the second gap film 182 is interposed between the main pole 13 and each of the first and second sidewalls SW1 and SW2.

A method of manufacturing the magnetic head according to the present embodiment will now be described. The method of manufacturing the magnetic head according to the present embodiment is the same as the method according to the first embodiment up to the step of FIG. 15A and FIG. 15B described in the first embodiment section. In the present embodiment, as the next step, the first portion of the gap section 17 of the present embodiment is formed. The step of forming the first portion of the gap section 17 of the present embodiment includes the step of forming the first gap film 181 and the step of forming the second gap film 182 to cover the first gap film 181.

The step of forming the first gap film 181 is performed after the step of FIG. 15A and FIG. 15B described in the first embodiment section. The step of forming the first gap film 181 starts with forming a nonmagnetic film, which will later become the first gap film 181, over the entire top surface of the stack. The nonmagnetic film is formed also in the receiving section 16Ac of the bottom shield 16A and in the recess 55a of the nonmagnetic layer 55. Where alumina is selected as the material of the nonmagnetic film (the first gap film 181), the nonmagnetic film is formed by atomic layer deposition (ALD), for example. Next, an etching mask is formed on the nonmagnetic film, the etching mask having an opening for exposing the vicinity of the location at which the medium facing surface 80 is to be formed. The etching mask is formed by patterning a photoresist layer by photolithography. Using the etching mask, a portion of the nonmagnetic film exposed from the opening of the etching mask is then removed by wet etching with an alkaline etching solution, for example. This makes the nonmagnetic film into the first gap film 181. The etching mask is then removed.

The first gap film 181 may be formed by a lift-off process. In such a case, first formed is a mask having an opening at a location at which the first gap film 181 is to be formed. The mask is formed by patterning a photoresist layer by photolithography. In the presence of the mask, a nonmagnetic film that will later become the first gap film 181 is then formed over the entire top surface of the stack. The mask is then lifted off. The remaining nonmagnetic film thereby becomes the first gap film 181.

The step of forming the second gap film 182 is performed after the step of forming the first gap film 181. In the step of forming the second gap film 182, the second gap film 182 is formed over the entire top surface of the stack. Where alumina is selected as the material of the second gap film 182, the second gap film 182 is formed by atomic layer deposition (ALD), for example. Where Ru is selected as the material of the second gap film 182, the second gap film 182 is formed by chemical vapor deposition (CVD), for example.

The next step of the method of manufacturing the magnetic head according to the present embodiment is to selectively etch the first and second gap films 181 and 182 to form therein openings for exposing the top surface of the magnetic layer 34 (see FIG. 6) and openings for exposing the top surface of the first connection layer (not illustrated). The subsequent steps are the same as those of the method according to the first embodiment.

In the present embodiment, at least a portion of the first gap film 181 is located in the receiving section 16Ac, and further, the at least portion of the first gap film 181 and a portion of the second gap film 182 are interposed between the main pole 13 and each of the third and fourth sidewalls SW3 and SW4. The present embodiment thus allows the distance between the main pole 13 and the bottom shield 16A to be increased by the thickness of the first gap film 181 when compared with the case where only the second gap film 182 is interposed between the main pole 13 and each of the third and fourth sidewalls SW3 and SW4. This makes it possible to reduce leakage of magnetic flux from the main pole 13 to the write shield 16. Consequently, the present embodiment is able to achieve improved overwrite property, reduced error rate and higher recording density.

Further, in the present embodiment, the receiving section 16Ac is formed in the bottom shield 16A, and a portion of the lower protrusion 14 is received in the receiving section 16Ac. In the present embodiment, the width in the track direction TW and the depth (the dimension in the direction perpendicular to the top surface 1a of the substrate 1) of the receiving section 16Ac can be adjusted according to the thickness of the first and second gap films 181 and 182. This makes it possible to provide the first and second gap films 181 and 182 without reducing the area of a cross section of the main pole 13 parallel to the medium facing surface 80 in the vicinity of the medium facing surface 80.

As in the second embodiment, the top surface 16Ab of the bottom shield 16A may extend in a direction substantially perpendicular to the medium facing surface 80. The remainder of configuration, function and effects of the present embodiment are similar to those of the first or second embodiment.

Fourth Embodiment

Figure 22:
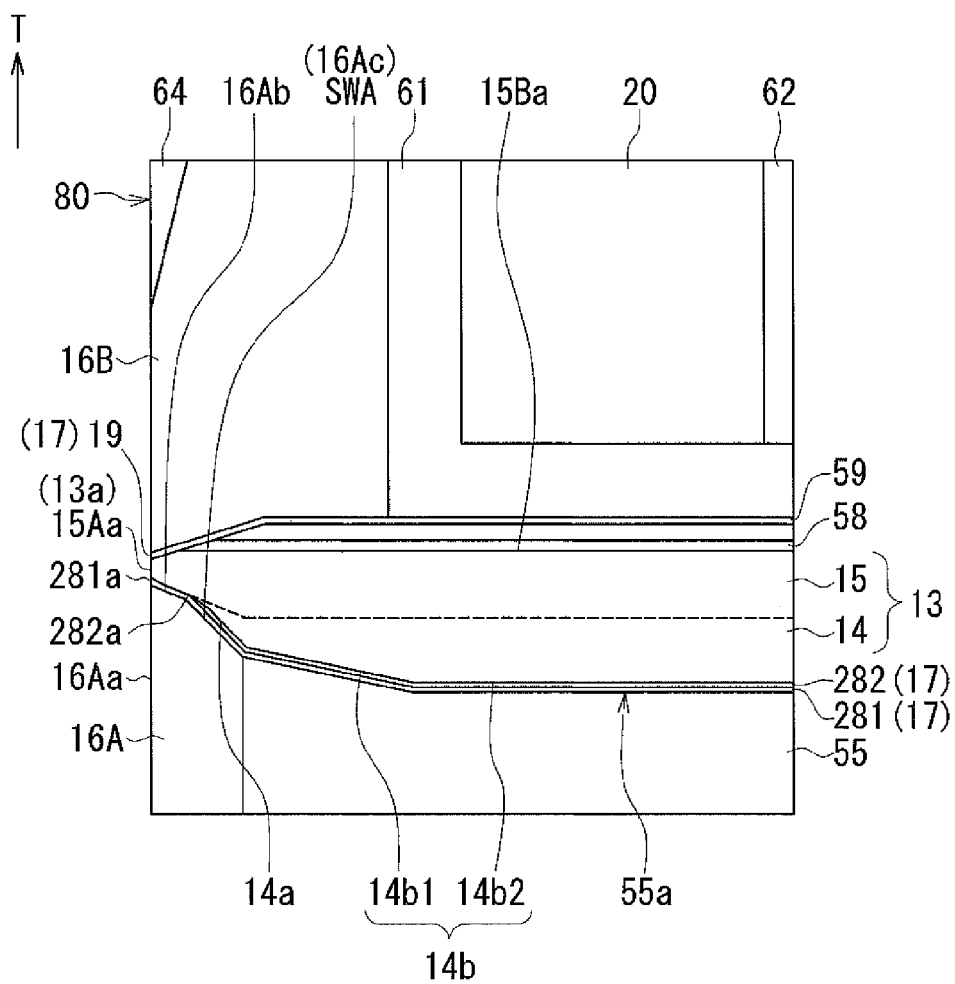
FIG. 22 is a cross-sectional view showing the main part of a magnetic head according to a fourth embodiment of the invention.
Figure 23:
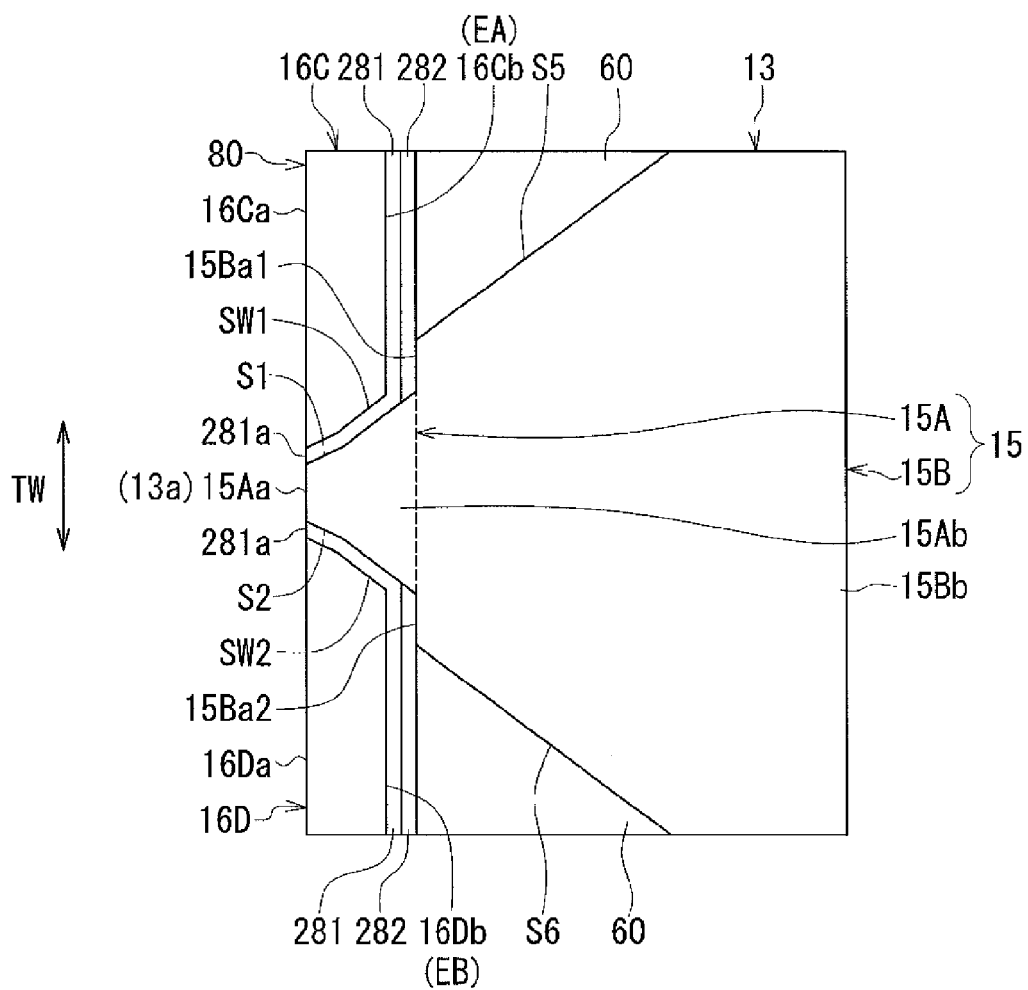
FIG. 23 is a plan view showing the main pole, the first side shield and the second side shield of the magnetic head according to the fourth embodiment of the invention.

A magnetic head according to a fourth embodiment of the invention will now be described with reference to FIG. 22 and FIG. 23. FIG. 22 is a cross-sectional view showing the main part of the magnetic head according to the present embodiment. FIG. 23 is a plan view showing the main pole, the first side shield and the second side shield of the magnetic head according to the present embodiment. The magnetic head according to the present embodiment is configured differently than the third embodiment in the following ways. In the magnetic head according to the present embodiment, the first portion of the gap section 17 includes a first gap film 281 and a second gap film 182 described below, in place of the first and second gap films 181 and 182 of the third embodiment.

The first gap film 281 has an end 281a located in the medium facing surface 80. A portion of the first gap film 281 is located in the receiving section 16Ac of the bottom shield 16A. In the present embodiment, as shown in FIG. 22 and FIG. 23, the first gap film 281 is disposed along the first sidewall SW1 and the first rear end face 16Cb of the first side shield 16C, the second sidewall SW2 and the second rear end face 16Db of the second side shield 16D, the top surface 16Ab of the bottom shield 16A, the front wall face SWA of the receiving section 16Ac, and the surface of the recess 55a of the nonmagnetic layer 55. The first gap film 281 is further disposed along the third sidewall SW3, the fourth sidewall SW4, the third connecting surface SW7 and the fourth connecting surface SW8 of the receiving section 16Ac which are shown in FIG. 5 relating to the first embodiment.

The second gap film 282 has an end 282a closest to the medium facing surface 80 and located at a distance from the medium facing surface 80. The distance from the medium facing surface 80 to the end 282a is, for example, the same as the distance from the medium facing surface 80 to the end 181a which has been described in the third embodiment section. At least a portion of the second gap film 282 is located above the receiving section 16Ac of the bottom shield 16A. The end 282a of the second gap film 282 may be located closer to the medium facing surface 80 than is the receiving section 16Ac or may be located above the receiving section 16Ac.

In the present embodiment, as shown in FIG. 22 and FIG. 23, the second gap film 282 is disposed along a portion of the first gap film 281 other than that extending along the first and second sidewalls SW1 and SW2.

In the present embodiment, as shown in FIG. 22, the main pole 13 is disposed over the bottom shield 16A and the nonmagnetic layer 55 with the first and second gap films 281 and 282 interposed between the main pole 13 and each of the bottom shield 16A and the nonmagnetic layer 55. Further, as shown in FIG. 23, the first and second gap films 281 and 282 are interposed also between the main pole 13 and each of the first and second side shields 16C and 16D. In the present embodiment, the first and second gap films 281 and 282 are interposed between the main pole 13 and each of the third and fourth sidewalls SW3 and SW4. Only the first gap film 281 is interposed between the main pole 13 and each of the first and second sidewalls SW1 and SW2.

The first gap film 281 is formed of, for example, the same material as the second gap film 182 which has been described in the third embodiment section. The first gap film 281 has a thickness the same as, for example, the thickness of the second gap film 182 which has been described in the third embodiment section. The second gap film 282 is formed of, for example, the same material as the first gap film 181 which has been described in the third embodiment section. The second gap film 282 has a thickness the same as, for example, the thickness of the first gap film 181 which has been described in the third embodiment section.

The shape and location of the second gap film 282 are not limited to the above-described example. For example, the whole of the second gap film 182 may be located above the receiving section 16Ac. Alternatively, a portion of the second gap film 182 may be disposed along the portion of the first gap film 281 extending along the first and second sidewalls SW1 and SW2. In such a case, the first gap film 181 and the second gap film 182 are interposed between the main pole 13 and each of the first and second sidewalls SW1 and SW2.

A method of manufacturing the magnetic head according to the present embodiment will now be described. In the method of manufacturing the magnetic head according to the present embodiment, the step of forming the first portion of the gap section 17 is different from that in the method according to the third embodiment. The step of forming the first portion of the gap section 17 in the present embodiment includes the step of forming the first gap film 281 and the step of forming the second gap film 282 on the first gap film 281.

The step of forming the first gap film 281 is performed after the step of FIG. 15A and FIG. 15B described in the first embodiment section. In the step of forming the first gap film 281, the first gap film 281 is formed over the entire top surface of the stack. The first gap film 281 is formed also in the receiving section 16Ac of the bottom shield 16A and in the recess 55a of the nonmagnetic layer 55. Where alumina is selected as the material of the first gap film 281, the first gap film 281 is formed by atomic layer deposition (ALD), for example. Where Ru is selected as the material of the first gap film 281, the first gap film 281 is formed by chemical vapor deposition (CVD), for example.

The step of forming the second gap film 282 is performed after the step of forming the first gap film 281. In the step of forming the second gap film 282, the second gap film 282 is formed by a lift-off process, for example. To form the second gap film 282 by a lift-off process, a mask is first formed on the first gap film 281, the mask having an opening at a location at which the second gap film 282 is to be formed. The mask is formed by patterning a photoresist layer by photolithography. In the presence of the mask, a nonmagnetic film that will later become the second gap film 282 is then formed over the entire top surface of the stack. Where alumina is selected as the material of the nonmagnetic film (the second gap film 282), the nonmagnetic film is formed by atomic layer deposition (ALD), for example. The mask is then lifted off. The remaining nonmagnetic film thereby becomes the second gap film 282.

The next step of the method of manufacturing the magnetic head according to the present embodiment is to selectively etch the first and second gap films 281 and 282 to form therein openings for exposing the top surface of the magnetic layer 34 (see FIG. 6) and openings for exposing the top surface of the first connection layer (not illustrated). The subsequent steps are the same as those of the method according to the third embodiment.

In the present embodiment, at least a portion of the second gap film 282 is located above the receiving section 16Ac, and further, a portion of the first gap film 281 and the at least portion of the second gap film 282 are interposed between the main pole 13 and each of the third and fourth sidewalls SW3 and SW4. The present embodiment thus allows the distance between the main pole 13 and the bottom shield 16A to be increased by the thickness of the second gap film 282 when compared with the case where only the first gap film 281 is interposed between the main pole 13 and each of the third and fourth sidewalls SW3 and SW4. This makes it possible to reduce leakage of magnetic flux from the main pole 13 to the write shield 16. Consequently, the present embodiment is able to achieve improved overwrite property, reduced error rate and higher recording density.

The remainder of configuration, function and effects of the present embodiment are similar to those of the third embodiment.

The present invention is not limited to the foregoing embodiments, and various modifications may be made thereto. For example, as far as the requirements of the appended claims are met, the shapes of the main pole 13, the bottom shield 16A, the top shield 16B, the first side shield 16C and the second side shield 16D are not limited to the examples illustrated in the foregoing embodiments, and can be chosen as desired.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head for perpendicular magnetic recording, comprising:

a medium facing surface configured to face a recording medium;

a coil for producing a magnetic field corresponding to data to be written on the recording medium;

a main pole for passing a magnetic flux corresponding to the magnetic field produced by the coil, and for producing a write magnetic field for use to write the data on the recording medium by means of a perpendicular magnetic recording system;

a write shield formed of a magnetic material;

a gap section formed of a nonmagnetic material and provided between the main pole and the write shield; and a substrate having a top surface, wherein the coil, the main pole, the write shield and the gap section are disposed above the top surface of the substrate, the write shield includes a bottom shield, a top shield, a first side shield and a second side shield, the main pole includes a main body, and a lower protrusion protruding from the main body toward the top surface of the substrate, the lower protrusion is located at a distance from the medium facing surface, the main body includes a front portion and a rear portion, the front portion being located closer to the medium facing surface than is the lower protrusion, the rear portion being located farther from the medium facing surface than is the front portion, the front portion has: an end face located in the medium facing surface; a top surface farthest from the top surface of the substrate; a bottom end opposite to the top surface; and a first side surface and a second side surface opposite to each other in a track width direction, the lower protrusion has: a front end face facing toward the medium facing surface; a bottom surface facing toward the top surface of the substrate; and a third side surface and a fourth side surface opposite to each other in the track width direction, the bottom shield is located on a rear side in a direction of travel of the recording medium relative to the front portion, the top shield is located on a front side in the direction of travel of the recording medium relative to the front portion, the first and second side shields are located on opposite sides of the front portion in the track width direction, the gap section includes a first portion interposed between the main pole and each of the bottom shield, the first side shield and the second side shield, and a second portion interposed between the main pole and the top shield, the first side shield has a first front end face located in the medium facing surface, a first sidewall opposed to the first side surface, and a first rear end face contiguous with the first sidewall and opposite to the first front end face, the second side shield has a second front end face located in the medium facing surface, a second sidewall opposed to the second side surface, and a second rear end face contiguous with the second sidewall and opposite to the second front end face, the bottom shield has a top surface farthest from the top surface of the substrate, and includes a receiving section recessed from the top surface of the bottom shield and receiving a portion of the lower protrusion, the receiving section has a front wall face opposed to the front end face of the lower protrusion, a third sidewall opposed to the third side surface, and a fourth sidewall opposed to the fourth side surface, the first sidewall has a first edge closest to the top surface of the substrate, the second sidewall has a second edge closest to the top surface of the substrate, the third sidewall has a third edge farthest from the top surface of the substrate, the fourth sidewall has a fourth edge farthest from the top surface of the substrate, the third edge is contiguous with the first edge, and the fourth edge is contiguous with the second edge.

2. The magnetic head for perpendicular magnetic recording according to claim 1, further comprising a nonmagnetic layer that is located farther from the medium facing surface than is the bottom shield and contiguous with the bottom shield, the nonmagnetic layer having a recess for receiving another portion of the lower protrusion.

3. The magnetic head for perpendicular magnetic recording according to claim 1, wherein a distance between the third edge and the fourth edge in the track width direction increases with increasing distance from the medium facing surface.

4. The magnetic head for perpendicular magnetic recording according to claim 1, wherein a distance from the medium facing surface to an arbitrary point on the front end face of the lower protrusion increases with decreasing distance from the arbitrary point to the top surface of the substrate.

5. The magnetic head for perpendicular magnetic recording according to claim 1, wherein a distance from the top surface of the substrate to an arbitrary point on the top surface of the bottom shield decreases with increasing distance from the arbitrary point to the medium facing surface.

6. The magnetic head for perpendicular magnetic recording according to claim 1, wherein each of the first rear end face and the second rear end face has an edge that is farthest from the top surface of the substrate and parallel to the medium facing surface.

7. The magnetic head for perpendicular magnetic recording according to claim 6, wherein the edge of the first rear end face and the edge of the second rear end face are each located at a distance of 30 to 90 nm from the medium facing surface.

8. The magnetic head for perpendicular magnetic recording according to claim 1, wherein in any cross section that intersects the rear portion and is parallel to the medium facing surface, the rear portion has a greater width in the track width direction than the lower protrusion.

9. The magnetic head for perpendicular magnetic recording according to claim 1, wherein in any cross section that intersects the first and second sidewalls and is parallel to the medium facing surface, a distance between the first sidewall and the second sidewall in the track width direction decreases with decreasing distance to the top surface of the substrate, and a distance between the first side surface and the second side surface in the track width direction decreases with decreasing distance to the top surface of the substrate.

10. The magnetic head for perpendicular magnetic recording according to claim 9, wherein the rear portion has a first end face opposed to the first rear end face, and a second end face opposed to the second rear end face, the first rear end face forms a smaller angle with respect to a direction perpendicular to the top surface of the substrate than does the first sidewall, the second rear end face forms a smaller angle with respect to the direction perpendicular to the top surface of the substrate than does the second sidewall, the first end face forms a smaller angle with respect to the direction perpendicular to the top surface of the substrate than does the first side surface, and the second end face forms a smaller angle with respect to the direction perpendicular to the top surface of the substrate than does the second side surface.

11. The magnetic head for perpendicular magnetic recording according to claim 1, wherein the first portion of the gap section includes a first gap film and a second gap film, the first gap film has an end that is closest to the medium facing surface and located at a distance from the medium facing surface, at least a portion of the first gap film being located in the receiving section, and the second gap film is stacked on the first gap film and has an end located in the medium facing surface.

12. The magnetic head for perpendicular magnetic recording according to claim 1, wherein the first portion of the gap section includes a first gap film and a second gap film, the first gap film has an end located in the medium facing surface, a portion of the first gap film being located in the receiving section, the second gap film is stacked on the first gap film and has an end that is closest to the medium facing surface and located at a distance from the medium facing surface, at least a portion of the second gap film being located above the receiving section.

13. A method of manufacturing the magnetic head for perpendicular magnetic recording of claim 1, comprising:

a step of forming an initial bottom shield;

a step of forming a first initial side shield and a second initial side shield after the step of forming the initial bottom shield, the first initial side shield including a first portion to be removed and a first pre-side-shield portion to become the first side shield, the second initial side shield including a second portion to be removed and a second pre-side-shield portion to become the second side shield;

a step of forming a mask for covering the first pre-side-shield portion of the first initial side shield and the second pre-side-shield portion of the second initial side shield;

an etching step of etching portions of the first and second initial side shields that are not covered with the mask and a portion of the initial bottom shield that is not covered with the first and second initial side shields and the mask so that the first portion to be removed of the first initial side shield and the second portion to be removed of the second initial side shield are removed and the receiving section is formed in the initial bottom shield;

a step of forming the first portion of the gap section after the etching step;

a step of forming an initial main pole after the step of forming the first portion of the gap section;

a step of forming the second portion of the gap section after the step of forming the initial main pole;

a step of forming an initial top shield after the step of forming the second portion of the gap section;

a step of forming the coil; and a step of forming the medium facing surface so that the initial bottom shield becomes the bottom shield, the first initial side shield becomes the first side shield, the second initial side shield becomes the second side shield, the initial main pole becomes the main pole, and the initial top shield becomes the top shield, wherein the first pre-side-shield portion has the first sidewall, the first portion to be removed has a fifth sidewall contiguous with the first sidewall, the second pre-side-shield portion has the second sidewall, and the second portion to be removed has a sixth sidewall contiguous with the second sidewall.

14. The method of manufacturing the magnetic head for perpendicular magnetic recording according to claim 13, wherein the magnetic head for perpendicular magnetic recording further comprises a nonmagnetic layer that is located farther from the medium facing surface than is the bottom shield and contiguous with the bottom shield, the nonmagnetic layer having a recess for receiving another portion of the lower protrusion, the method further comprises a step of forming an initial nonmagnetic layer before the step of forming the first initial side shield and the second initial side shield, the first initial side shield and the second initial side shield are formed over the initial bottom shield and the initial nonmagnetic layer, and in the etching step, a portion of the initial nonmagnetic layer that is not covered with the first and second initial side shields is etched so that the recess is formed in the initial nonmagnetic layer and the initial nonmagnetic layer thereby becomes the nonmagnetic layer.

15. The method of manufacturing the magnetic head for perpendicular magnetic recording according to claim 13, wherein in any cross section that intersects the rear portion and is parallel to the medium facing surface, the rear portion has a greater width in the track width direction than the lower protrusion, and in the step of forming the initial main pole, the initial main pole is formed by frame plating.

16. The method of manufacturing the magnetic head for perpendicular magnetic recording according to claim 13, wherein the first portion of the gap section includes a first gap film and a second gap film, the first gap film having an end that is closest to the medium facing surface and located at a distance from the medium facing surface, at least a portion of the first gap film being located in the receiving section, the second gap film having an end located in the medium facing surface, and the step of forming the first portion of the gap section includes a step of forming the first gap film and a step of forming the second gap film to cover the first gap film.

17. The method of manufacturing the magnetic head for perpendicular magnetic recording according to claim 13, wherein the first portion of the gap section includes a first gap film and a second gap film, the first gap film having an end located in the medium facing surface, a portion of the first gap film being located in the receiving section, the second gap film having an end that is closest to the medium facing surface and located at a distance from the medium facing surface, at least a portion of the second gap film being located above the receiving section, and the step of forming the first portion of the gap section includes a step of forming the first gap film and a step of forming the second gap film on the first gap film.

\* \* \* \* \*